United States Patent
Kawai et al.

(10) Patent No.: US 9,466,421 B2
(45) Date of Patent: Oct. 11, 2016

(54) RESONANCE COUPLER AND TRANSMISSION DEVICE

(71) Applicant: Panasonic Intellectual Property Management Co., Ltd., Osaka (JP)

(72) Inventors: Yasufumi Kawai, Osaka (JP); Shuichi Nagai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/822,094

(22) Filed: Aug. 10, 2015

(65) Prior Publication Data
US 2016/0065168 A1    Mar. 3, 2016

(30) Foreign Application Priority Data

Aug. 28, 2014 (JP) ................................. 2014-174458

(51) Int. Cl.
  *H01P 5/02*   (2006.01)
  *H01F 38/14*  (2006.01)
  *H01P 1/203*  (2006.01)
  *H01P 5/04*   (2006.01)

(52) U.S. Cl.
  CPC ........... *H01F 38/14* (2013.01); *H01P 1/20345* (2013.01)

(58) Field of Classification Search
  CPC .................................... H01P 5/02; H01P 5/04
  USPC ............ 333/24 R, 219, 219.1, 117, 202, 204
  See application file for complete search history.

(56) References Cited

U.S. PATENT DOCUMENTS

| | | | | |
|---|---|---|---|---|
| 7,276,995 B2* | 10/2007 | Hamada | ............. | H01P 1/20381 333/204 |
| 8,044,751 B2* | 10/2011 | Tsai | .................... | H01P 1/20372 333/205 |
| 9,093,973 B2* | 7/2015 | Nagai | .................. | H01P 1/2013 |

(Continued)

FOREIGN PATENT DOCUMENTS

| | | |
|---|---|---|
| JP | 5-095203 | 4/1993 |
| JP | 5-335811 | 12/1993 |

(Continued)

OTHER PUBLICATIONS

Xiu-Yin-Zhang et al., Dual-Bandpass Filters Using Stub-Loaded Resonators, Aug. 2007, IEEE, vol. 17, No. 8, 3 pages.*

(Continued)

*Primary Examiner* — Dean Takaoka
(74) *Attorney, Agent, or Firm* — McDermott Will & Emery LLP

(57) ABSTRACT

A resonance coupler according to one aspect of the present disclosure includes first resonance wiring and second resonance wiring. The first resonance wiring includes first open loop wiring, first input/output wiring extending outwardly from a first connection portion of the first open loop wiring, and first stub wiring extending inwardly from a second connection portion of the first open loop wiring. The second resonance wiring includes second open loop wiring, and second input/output wiring extending outwardly from a third connection portion of the second open loop wiring. The first stub wiring includes a first connection end connected to the second connection portion and a first open end on an opposite side. A wiring length from the first connection portion to the first open end is one-quarter of a wavelength of an nth-order harmonic of a radio-frequency signal, where n is an integer not less than 2.

17 Claims, 21 Drawing Sheets

(56) References Cited

U.S. PATENT DOCUMENTS

| | | | |
|---|---|---|---|
| 9,184,723 B2* | 11/2015 | Nagai | H01P 5/028 |
| 9,270,008 B2* | 2/2016 | Wada | H01P 1/20381 |
| 9,325,047 B1* | 4/2016 | Mumcu | H01P 1/2135 |
| 9,391,353 B2* | 7/2016 | Nagai | H01P 5/028 |
| 2011/0316347 A1 | 12/2011 | Endo et al. | |
| 2014/0049338 A1 | 2/2014 | Nagai et al. | |

FOREIGN PATENT DOCUMENTS

| | | |
|---|---|---|
| JP | 2008-067012 | 3/2008 |
| JP | 2009-246810 | 10/2009 |
| JP | 2012-010586 | 1/2012 |
| JP | 2013-165389 | 8/2013 |

OTHER PUBLICATIONS

W.T. Koh et al., Dual-band Bandpass Filter Design Using Stub-loaded Resonators, Aug. 2012, Progress In Electromagnetic Research Symposium, 4 pages.*

Priyanka-Mondal et al., Design of Dual-Band Bandpass Filters Using Stub-loaded Open-Loop Resonators, Jan. 2008, IEEE, vol. 56, No. 1, 6 pages.*

S. Nagai, et al., "A DC-Isolated Gate Drive IC with Drive-by-Microwave Technology for Power Switching Devices", 2012 IEEE ISSCC Digest of Technical Papers, vol. 65, pp. 404-405, Feb. 2012.

* cited by examiner

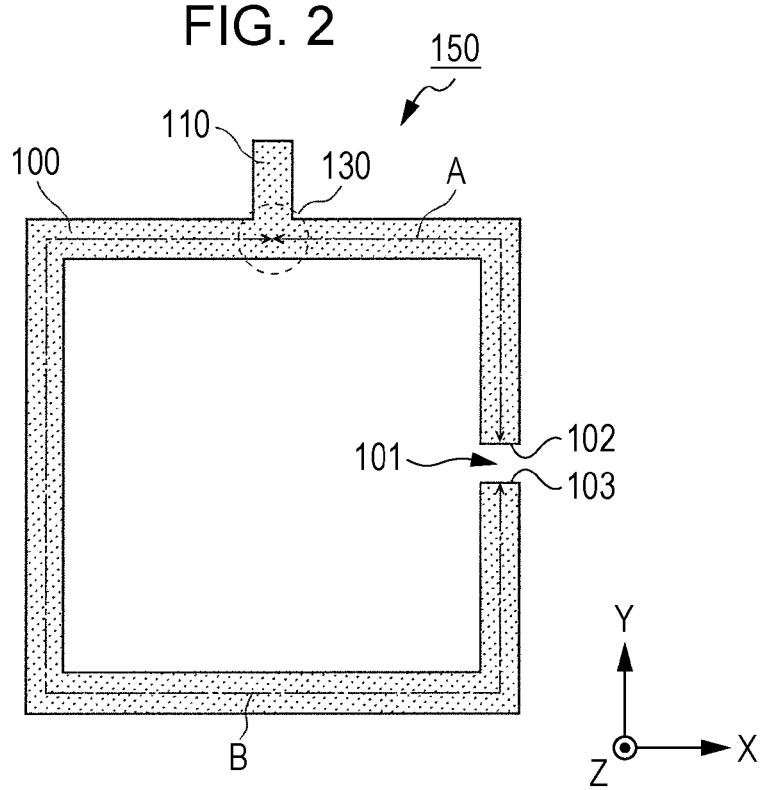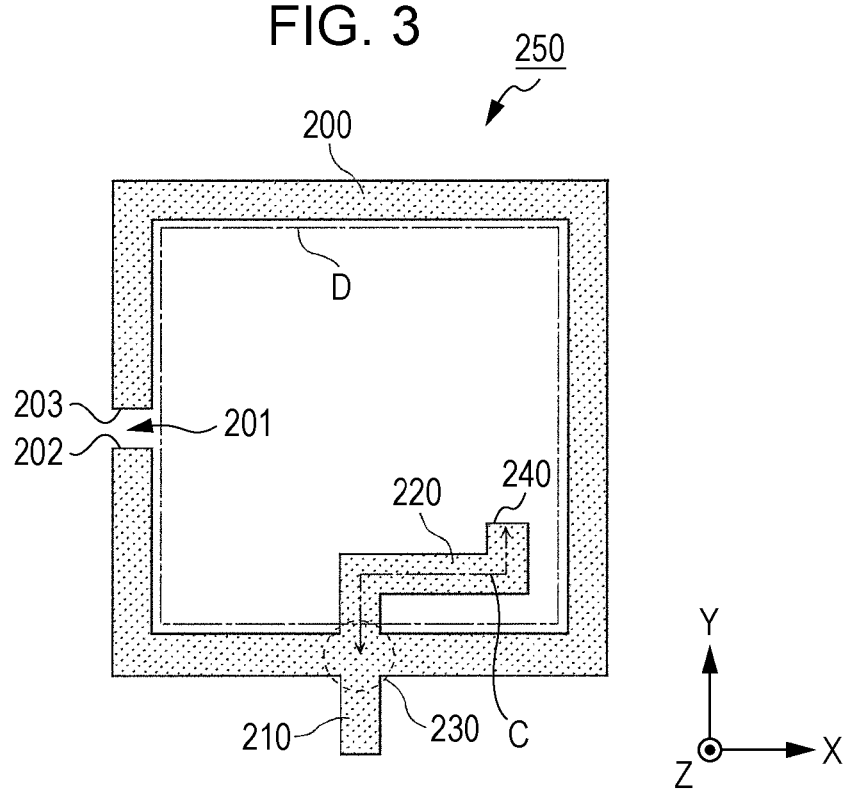

FREQ. (100.0 MHz TO 10.00 GHz)

FREQ. (100.0 MHz TO 10.00 GHz)

RESONANCE COUPLER AND TRANSMISSION DEVICE

BACKGROUND

1. Technical Field

The present disclosure relates to a resonance coupler and a transmission device.

2. Description of the Related Art

An electromagnetic resonance coupler is proposed as an element capable of isolatedly transmitting a signal and power simultaneously. Japanese Unexamined Patent Application Publication No. 2008-067012 discloses a conventional electromagnetic resonance coupler. S. Nagai et al., "A DC-isolated gate drive IC with drive-by-microwave technology for power switching devices", 2012 IEEE ISSCC Digest of Technical Papers, Vol. 65, pp. 404-405, February 2012 discloses a different conventional electromagnetic resonance coupler.

SUMMARY

There is demand for improvement in power conversion efficiency in a transmission device having a resonance coupler.

One non-limiting and exemplary embodiment provides a transmission device having high power conversion efficiency and a resonance coupler which improves power conversion efficiency.

A resonance coupler according to one aspect of the present disclosure comprises first resonance wiring which includes first open loop wiring having a first open portion, first input/output wiring extending outwardly from a first connection portion of the first open loop wiring, and first stub wiring extending inwardly from a second connection portion of the first open loop wiring, the first stub wiring including a first connection end which is connected to the second connection portion of the first open loop wiring and a first open end on a side opposite to the first connection end, and second resonance wiring which includes second open loop wiring having a second open portion, the second open loop wiring facing the first open loop wiring and second input/output wiring extending outwardly from a third connection portion of the second open loop wiring, wherein a radio-frequency signal is isolatedly transmitted between the first open loop wiring and the second open loop wiring, and a wiring length from the first connection portion of the first open loop wiring to the first open end of the first stub wiring is one-quarter of a wavelength of an nth-order harmonic of the radio-frequency signal, where n is an integer not less than 2.

Comprehensive or specific aspects may be implemented as a transmission device.

The resonance coupler according to the one aspect of the present disclosure can improve power conversion efficiency in a circuit connected to the resonance coupler.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

BRIEF DESCRIPTION OF THE DRAWINGS

FIG. 2 is a plan view of a sending-side resonator in the electromagnetic resonance coupler shown in FIG. 1;

FIG. 3 is a plan view of a receiving-side resonator in the electromagnetic resonance coupler shown in FIG. 1;

DETAILED DESCRIPTION

Overview of Embodiments

Figure 1:
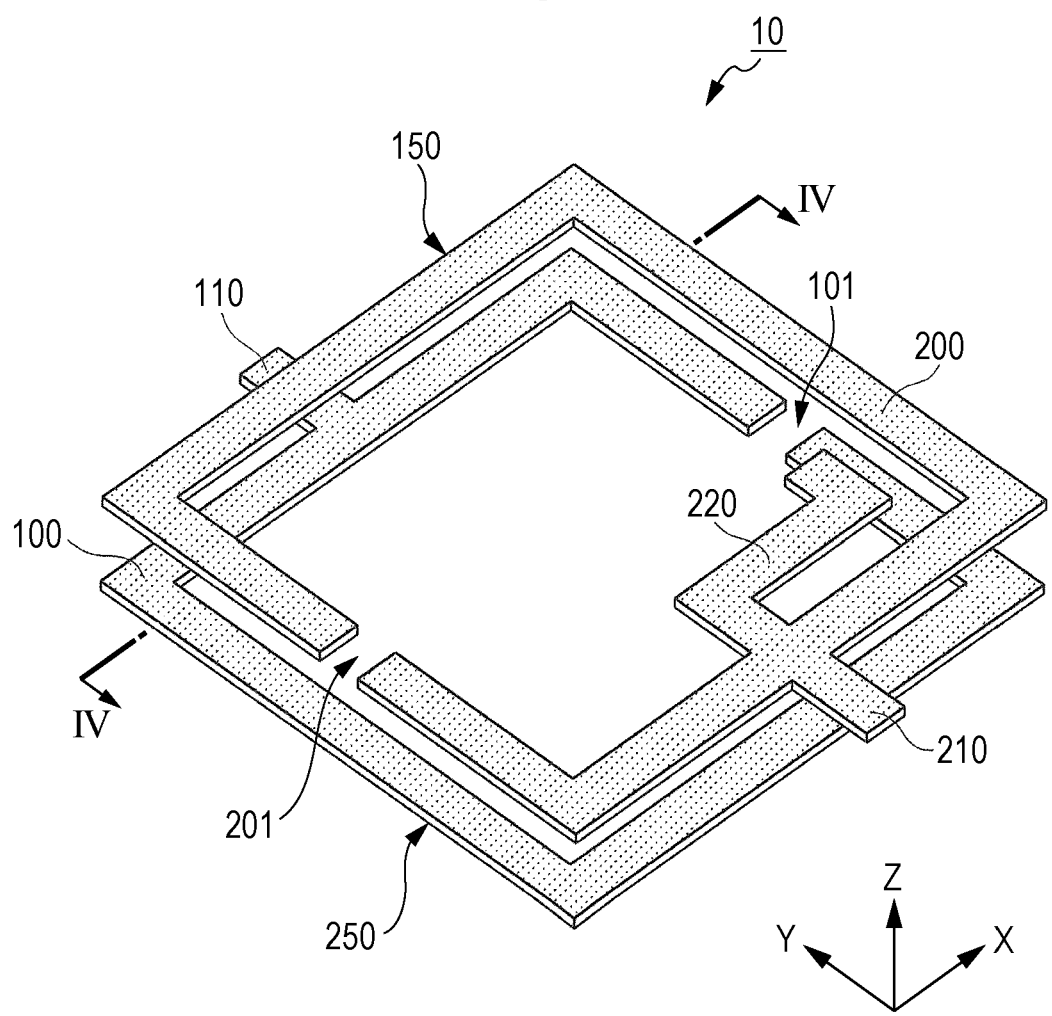
FIG. 1 is a perspective view showing a structural example of wiring of an electromagnetic resonance coupler according to a first embodiment.

A resonance coupler according to a first aspect of the present disclosure includes first resonance wiring and second resonance wiring. The first resonance wiring includes first open loop wiring, first input/output wiring, and first stub wiring. The first open loop wiring has a first open portion. The first input/output wiring extends outwardly from a first connection portion of the first open loop wiring. The first stub wiring extends inwardly from a second connection portion of the first open loop wiring. The first stub wiring includes a first connection end and a first open end. The first connection end is connected to the second connection portion of the first open loop wiring. The first open end is on a side opposite to the first connection end. The second resonance wiring includes second open loop wiring, and second input/output wiring. The second open loop wiring has a second open portion. The second open loop wiring faces the first open loop wiring. A radio-frequency signal is isolatedly transmitted from one of the first and second open loop wirings to the other. The second input/output wiring extends outwardly from a third connection portion of the second open loop wiring. A wiring length from the first connection portion of the first open loop wiring to the first open end of the first stub wiring is one-quarter of a wavelength of an nth-order harmonic of the radio-frequency signal, where n is an integer not less than 2.

The resonance coupler with the above-described configuration enables utilization of a harmonic of a radio-frequency signal. For example, a peripheral circuit connected to the resonance coupler can use the harmonic of a radio-frequency signal. Thus, power of the radio-frequency signal can be efficiently used. Examples of the peripheral circuit include a rectifying circuit and an amplifier circuit. For example, if the resonance coupler is electrically connected to a rectifying circuit, the resonance coupler can improve efficiency in conversion from radio-frequency power into DC power in the rectifying circuit.

Note that the first resonance wiring may be included in the input-side part of the resonance coupler or included in the output-side part of the resonance coupler. In other words, a radio-frequency signal may be isolatedly transmitted from the first open loop wiring to the second open loop wiring or isolatedly transmitted from the second open loop wiring to the first open loop wiring.

In the present disclosure, the term "input/output wiring" may refer to a piece of wiring for at least one of input and output of a radio-frequency signal. In the present disclosure, the term "connection end" is not limited to an actual end portion of a piece of wiring and may also refer to a virtual end portion for distinguishing a portion from a piece of integrally formed wiring.

In the present disclosure, various relationships between wiring lengths and wavelengths may be achieved to the extent that manufacturing variations are tolerated and to the extent that correction performed in view of an inter-wiring capacitance is tolerated.

In the resonance coupler according to the first aspect of the present disclosure, the radio-frequency signal may be input to the second input/output wiring, isolatedly transmitted from the second open loop wiring to the first open loop wiring with electromagnetic resonant coupling, and output from the first input/output wiring. In this case, the second resonance wiring is a piece of input-side resonance wiring while the first resonance wiring is a piece of output-side resonance wiring.

In the resonance coupler according to the first aspect of the present disclosure, the second resonance wiring may not include different wiring having an open end in a region surrounded by the second open loop wiring. Alternatively, the second resonance wiring may further include second stub wiring which extends inwardly from a fourth connection portion of the second open loop wiring. In the latter case, the second stub wiring may include a second connection end and a second open end. The second connection end is connected to the fourth connection portion of the second open loop wiring. The second open end is on a side opposite to the second connection end. A wiring length from the third connection portion of the second open loop wiring to the second open end of the second stub wiring may be one-quarter of the wavelength of the nth-order harmonic.

In the resonance coupler according to the first aspect of the present disclosure, the first input/output wiring may include a connection end which is connected to the first connection portion. The connection end of the first input/output wiring and the first connection end of the first stub wiring may be located adjacent to each other across the first open loop wiring. With this configuration, for example, if a peripheral device is electrically connected to the resonance coupler, a wiring length from the resonance coupler to the peripheral device can be designed with high accuracy.

In the resonance coupler according to the first aspect of the present disclosure, a wiring length between the first connection portion and the second connection portion may be not less than one-half of a minimum value of a wiring width of the first resonance wiring.

In the resonance coupler according to the first aspect of the present disclosure, the first stub wiring may include a main part extending along part of the first open loop wiring. The part of the first open loop wiring and the main part of the first stub wiring may be spaced by not less than one-half of a minimum value of a wiring width of the first resonance wiring. This configuration allows a reduction in an inter-line capacitance between the first open loop wiring and the first stub wiring and improvement in a transmission characteristic between input and output of the resonance coupler.

In the resonance coupler according to the first aspect of the present disclosure, the first open loop wiring and the second open loop wiring may be rectangular.

In the resonance coupler according to the first aspect of the present disclosure, the first open loop wiring and the second open loop wiring may have a shape with no angulate portion. This allows a reduction in field emission from an angulate portion.

In the resonance coupler according to the first aspect of the present disclosure, a wiring length of the first open loop wiring and a wiring length of the second open loop wiring may be both one-half of a wavelength of a fundamental of the radio-frequency signal.

In the resonance coupler according to the first aspect of the present disclosure, a portion of the first open loop wiring may be grounded, and a portion of the second open loop wiring may be grounded.

In the resonance coupler according to the first aspect of the present disclosure, one end of the first open loop wiring may be grounded, and a wiring length of the first open loop wiring may be one-quarter of a fundamental of the radio-frequency signal. One end of the second open loop wiring may be grounded, and a wiring length of the second open loop wiring may be one-quarter of the wavelength of the fundamental of the radio-frequency signal.

In the resonance coupler according to the first aspect of the present disclosure, a wiring length from the first connection portion of the first open loop wiring to one end of the first open loop wiring may be one-quarter of a wavelength of an mth-order harmonic of the radio-frequency signal, where m is an integer different from n and not less than 2.

In the resonance coupler according to the first aspect of the present disclosure, the first resonance wiring and the second resonance wiring may face each other across an insulating substrate.

A resonance coupler according to a second aspect of the present disclosure includes first resonance wiring and second resonance wiring. The first resonance wiring includes first open loop, first output wiring, second output wiring, first stub wiring, and second stub wiring extending. The first open loop wiring has a first open portion. The first output wiring extends outwardly from a first connection portion of the first open loop wiring. The second output wiring extends outwardly from a second connection portion of the first open loop wiring. The first stub wiring extends inwardly from a third connection portion of the first open loop wiring. The first stub wiring includes a first connection end and a first open end. The first connection end is connected to the third connection portion of the first open loop wiring. The first open end is on a side opposite to the first connection end. The second stub wiring extends inwardly from a fourth connection portion of the first open loop wiring. The second stub wiring includes a second connection end and a second open end. The second connection end is connected to the fourth connection portion of the first open loop wiring. The second open end is on a side opposite to the second connection end. The second resonance wiring includes second open loop wiring and first input wiring. The second open loop wiring has a second open portion. The second open loop wiring faces the first open loop wiring. The second open loop wiring isolatedly transmits a radio-frequency signal to the first open loop wiring. The first input wiring extends outwardly from a fifth connection portion of the second open loop wiring. A first wiring length from the first connection portion of the first open loop wiring to the first open end of the first stub wiring is one-quarter of a wavelength of an nth-order harmonic of the radio-frequency signal, where n is an integer not less than 2. A second wiring length from the second connection portion of the first open loop wiring to the second open end of the second stub wiring is one-quarter of the wavelength of the nth-order harmonic of the radio-frequency signal.

The resonance coupler with the above-described configuration enables utilization of a harmonic of a radio-frequency signal. For example, a peripheral circuit connected to the resonance coupler can use the harmonic of the radio-frequency signal. Thus, power of the radio-frequency signal can be efficiently used. Additionally, since the resonance coupler includes the first output wiring and the second output wiring, the resonance coupler can output a plurality of radio-frequency signals.

In the resonance coupler according to the second aspect of the present disclosure, the first output wiring and the second output wiring may be arranged symmetrically with respect to a straight line passing through the first open portion of the first open loop wiring. This configuration allows synchronization of a radio-frequency signal output from the first output wiring and a radio-frequency signal output from the second output wiring. The first stub wiring and the second stub wiring may be arranged symmetrically with respect to the straight line. The term "straight line" here refers to a virtual straight line.

In the resonance coupler according to the second aspect of the present disclosure, the first output wiring may include a third connection end which is connected to the first connection portion. The third connection end of the first output wiring and the first connection end of the first stub wiring may be located adjacent to each other across the first open loop wiring. Additionally, the second output wiring may include a fourth connection end which is connected to the second connection portion. The fourth connection end of the second output wiring and the second connection end of the second stub wiring may be located adjacent to each other across the first open loop wiring. With this configuration, for example, if a peripheral device is electrically connected to the resonance coupler, a wiring length from the resonance coupler to the peripheral device can be designed with high accuracy.

In the resonance coupler according to the second aspect of the present disclosure, the first open loop wiring may include a first portion and a second portion. The first portion surrounds a first rectangular region, and the second portion surrounds a second rectangular region. The first stub wiring may extend in a direction along a long side of the first rectangular region in the first rectangular region, and the second stub wiring may extend in a direction along a long side of the second rectangular region in the second rectangular region.

In the resonance coupler according to the second aspect of the present disclosure, the first resonance wiring may further include grounding wiring at an intersection of the first open loop wiring and the straight line. The grounding wiring is connected to the first open loop wiring.

In the resonance coupler according to the second aspect of the present disclosure, the second resonance wiring may not include different wiring having an open end in a region surrounded by the second open loop wiring.

In the resonance coupler according to the second aspect of the present disclosure, the second resonance wiring may further include second input wiring. The second input wiring extends outwardly from a sixth connection portion of the second open loop wiring. This configuration allows the resonance coupler to separately and isolatedly transmit a plurality of input radio-frequency signals.

In the resonance coupler according to the second aspect of the present disclosure, a third wiring length between the first connection portion and the third connection portion may be not less than one-half of a minimum value of a wiring width of the first resonance wiring. A fourth wiring length between the second connection portion and the fourth connection portion may be not less than one-half of the minimum value of the wiring width of the first resonance wiring.

In the resonance coupler according to the second aspect of the present disclosure, The first stub wiring may include a first main part extending along a first part of the first open loop wiring, and the second stub wiring may include a second main part extending along a second part of the first open loop wiring. The first main part of the first open loop wiring and the first part of the first stub wiring may be spaced by not less than one-half of a minimum value of a wiring width of the first resonance wiring. The second main part of the second open loop wiring and the second part of the second stub wiring may be spaced by not less than one-half of a minimum value of a wiring width of the first resonance wiring. This configuration allows a reduction in an inter-line capacitance between the first open loop wiring and each piece of stub wiring, thereby enabling improvement in a transmission characteristic between input and output of the resonance coupler.

In the resonance coupler according to the second aspect of the present disclosure, a wiring length of the first open loop wiring and a wiring length of the second open loop wiring may be both one-half of a wavelength of a fundamental of the radio-frequency signal.

In the resonance coupler according to the second aspect of the present disclosure, a portion of the first open loop wiring may be grounded, and a portion of the second open loop wiring may be grounded.

In the resonance coupler according to the second aspect of the present disclosure, the first open loop wiring may include a grounding portion. A wiring length from one end of the first open loop wiring to the grounding portion may be equal to a wiring length from another end of the first open loop wiring to the grounding portion. The second open loop wiring may include a grounding portion. A wiring length from one end of the second open loop wiring to the grounding portion may be equal to a wiring length from another end of the second open loop wiring to the grounding portion. This configuration allows a plurality of radio-frequency signals to be synchronized and isolatedly transmitted.

In the resonance coupler according to the second aspect of the present disclosure, a wiring length from the first connection portion of the first open loop wiring to one end of the first open loop wiring may be one-quarter of a wavelength of an mth-order harmonic of the radio-frequency signal, where m is an integer different from n and not less than 2. A wiring length from the second connection portion of the first open loop wiring to another end of the first open loop wiring may be one-quarter of the wavelength of the mth-order harmonic of the radio-frequency signal, where m is an integer different from n and not less than 2.

In the resonance coupler according to the second aspect of the present disclosure, the first resonance wiring and the second resonance wiring may face each other across an insulating substrate.

A transmission device according to a third aspect of the present disclosure includes a first circuit, a second circuit, and a resonance coupler according to any one of the above-described aspects. A radio-frequency signal is output from the first circuit, isolatedly transmitted from the first circuit to the second circuit, and input into the circuit. For example, the first circuit may be a sending circuit, and the second circuit may be a receiving circuit. The sending circuit sends the radio-frequency signal, and a receiving circuit receives the radio-frequency signal.

In the transmission device according to the third aspect of the present disclosure, the receiving circuit may include a diode. One electrode of the diode is electrically connected to the output wiring of the resonance coupler. In this case, a wiring length from the first connection portion of the resonance coupler to the one electrode of the diode may be an odd multiple of one-quarter of the wavelength of the nth-order harmonic.

In the transmission device according to the third aspect of the present disclosure, the first circuit may generate the radio-frequency signal by modulating a radio-frequency wave in accordance with an input signal. The receiving circuit may generate an output signal by rectifying the radio-frequency signal.

Embodiments will be described below in detail with reference to the drawings. Note that the embodiments described below are all comprehensive or specific examples. Numerical values, shapes, materials, properties, constituent elements, arrangement positions and connection forms of the constituent elements, and the like illustrated in the embodiments below are merely illustrative, and are not intended to limit the present disclosure. Among the constituent elements in the embodiments below, those not described in an independent claim representing a top-level concept will be described as optional constituent elements.

Note that the drawings are schematic and not necessarily to scale. Substantially the same components in the drawings are denoted by the same reference characters throughout the drawings, and redundant descriptions may be omitted or simplified.

First Embodiment

Overall Configuration

The overall configuration of an electromagnetic resonance coupler 10 according to a first embodiment will be described. FIG. 1 is a perspective view showing the structure of wiring included in the electromagnetic resonance coupler 10. Note that two orthogonal directions in a plane, in which pieces of wiring extend, may be referred to as an X-axis and a Y-axis, and that a direction perpendicular to an X-Y plane may be referred to as a Z-axis direction, in the description below. The X-axis and the Y-axis are, for example, parallel to a principal surface of a substrate (not shown). A Z-axis is, for example, perpendicular to the principal surface of the substrate (not shown). For brevity, a Z-axis positive direction may be referred to as "upward" while a Z-axis negative direction may be referred to as "downward".

The electromagnetic resonance coupler 10 includes a planar sending-side resonator 150 and a planar receiving-side resonator 250 which faces the sending-side resonator 150. For example, the sending-side resonator 150 and the receiving-side resonator 250 are formed as pieces of wiring on different substrates (not shown). The sending-side resonator 150 and the receiving-side resonator 250 may be, for example, pieces of copper wiring. The sending-side resonator 150 is an example of "second resonance wiring", and the receiving-side resonator 250 is an example of "first resonance wiring".

A radio-frequency signal is isolatedly transmitted from the sending-side resonator 150 to the receiving-side resonator 250. A radio-frequency signal may have, for example, a sinusoidal waveform. The frequency of radio-frequency signals is, for example, not less than 1 MHz.

[Shapes of Sending-Side Resonator and Receiving-Side Resonator]

The shape of the sending-side resonator 150 will be described first. FIG. 2 is a plan view of the sending-side resonator 150.

The sending-side resonator 150 includes a first resonator 100 and input wiring 110 which is connected to the first resonator 100.

The first resonator 100 is a piece of rectangularly looped wiring and has an open portion 101 at which the first resonator 100 is partially opened. One end 102 and the other end 103 of the first resonator 100 are opposed to each other across the open portion 101. The interval between the one end 102 and the other end 103 of the first resonator 100 is, for example, larger than 0 mm and is not more than one-quarter of the effective wavelength of a radio-frequency signal. In FIG. 2, the wiring length of the first resonator 100 is one-half of the wavelength of a radio-frequency signal. Note that the expression "the wavelength of a radio-frequency signal" refers to the wavelength of a fundamental of radio-frequency components included in a radio-frequency signal in the present disclosure unless otherwise specified. The first resonator 100 functions as a sending antenna for a radio-frequency signal.

The first resonator 100 is an example of "second open loop wiring", and the input wiring 110 is an example of "second input/output wiring". In the present disclosure, the term "open loop wiring" refers to a piece of wiring which surrounds a predetermined region and is partially opened. Examples of a region surrounded by open loop wiring include a circular region, an elliptical region, a polygonal region, and a combination thereof (for example, a region in a race track shape). A region surrounded by open loop wiring may have an inwardly concave portion. In this case, the open loop wiring is shaped so as to meander with a radially inward curve in plan view.

The input wiring 110 includes a connection end which is connected to a connection portion 130 of the first resonator 100 and an input end to which a radio-frequency signal is to be input. In FIG. 2, the input wiring 110 is a piece of linear wiring extending in the Y direction.

In FIG. 2, a wiring length from the connection portion 130 of the first resonator 100 to the one end 102 of the first resonator 100 is referred to as a wiring length A while a wiring length from the connection portion 130 of the first resonator 100 to the other end 103 of the first resonator 100 is referred to as a wiring length B. In this case, an overall wiring length of the first resonator 100 is referred to as a wiring length A+B. The wiring length A+B of the first resonator 100 is, for example, one-half of the wavelength of a radio-frequency signal. In FIG. 2, the connection portion 130 is located such that the wiring length A from the connection portion 130 of the first resonator 100 to the one end 102 of the first resonator 100 is one-quarter of the overall wiring length A+B of the first resonator 100. Note that the location of the connection portion 130 is not limited to this.

In the example shown in FIG. 2, the first resonator 100 and the input wiring 110 have uniform wiring widths. Note that the wiring widths may not be uniform. For example, the first resonator 100 and the input wiring 110 may be different in wiring width or a portion of the first resonator 100 may be different in wiring width from a different portion.

The shape of the receiving-side resonator 250 will be described. FIG. 3 is a plan view of the receiving-side resonator 250.

The receiving-side resonator 250 includes a second resonator 200, output wiring 210 which is connected to the second resonator 200, and stub wiring 220 which is connected to the second resonator 200.

The second resonator 200 is a piece of rectangularly looped wiring and has an open portion 201 at which the second resonator 200 is partially opened. One end 202 and the other end 203 of the second resonator 200 are opposed to each other across the open portion 201. The interval between the one end 202 and the other end 203 of the second resonator 200 is, for example, larger than 0 mm and is not more than one-quarter of the effective wavelength of a radio-frequency signal. In FIG. 3, the wiring length of the second resonator 200 is one-half of the wavelength of a radio-frequency signal. The second resonator 200 functions as a receiving antenna for a radio-frequency signal.

The second resonator 200 is an example of "first open loop wiring", the output wiring 210 is an example of "first input/output wiring", and the stub wiring 220 is an example of "first stub wiring".

The output wiring 210 includes a connection end which is connected to a connection portion 230 of the second resonator 200 and an output end from which a radio-frequency signal is output. In FIG. 3, the output wiring 210 is a piece of linear wiring extending in the Y direction.

In FIG. 3, the connection portion 230 is located such that a wiring length from the connection portion 230 of the second resonator 200 to the one end 202 of the second resonator 200 is one-quarter of an overall wiring length of the second resonator 200. Note that the location of the connection portion 230 is not limited to this.

One end of the stub wiring 220 is an open end 240, and the other end is a connection end which is connected to the connection portion 230 of the second resonator 200. In FIG. 3, the stub wiring 220 is bent at a right angle so as to follow the shape of the second resonator 200. Note that the shape of the stub wiring 220 is not limited to this.

The stub wiring 220 reflects a harmonic of a radio-frequency signal incident on the output wiring 210. In FIG. 3, a wiring length from the open end 240 of the stub wiring 220 to the connection portion 230 of the second resonator 200 is referred to as a wiring length C. The wiring length C is, for example, one-quarter of the wavelength of a third-order harmonic of a radio-frequency signal. Note that a harmonic order is not limited to this.

In FIG. 3, the stub wiring 220 is located in a region D which is surrounded by the second resonator 200.

In the example shown in FIG. 3, the second resonator 200, the output wiring 210, and the stub wiring 220 have uniform wiring widths. Note that the wiring widths may not be uniform.

[Positional Relationship Between Sending-Side and Receiving-Side Resonators]

Figure 4:
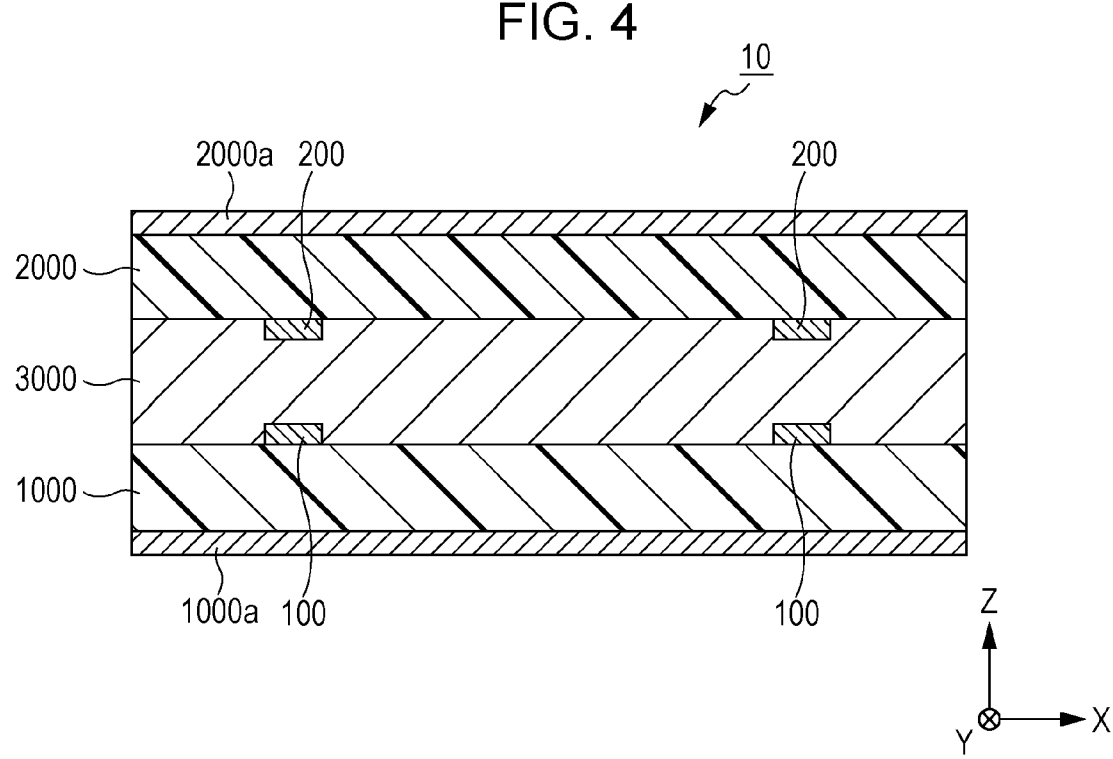
FIG. 4 is a cross-sectional view of the electromagnetic resonance coupler shown in FIG. 1 taken along line IV-IV.

The positional relationship between the sending-side resonator 150 and the receiving-side resonator 250 will be described. FIG. 4 is a cross-sectional view of the electromagnetic resonance coupler 10 taken along line IV-IV in FIG. 1.

The electromagnetic resonance coupler 10 includes a substrate 1000, a substrate 3000, and a substrate 2000. The substrates 1000, 3000, and 2000 are stacked in this order. The first resonator 100 is located between the substrate 1000 and the substrate 3000. The second resonator 200 is located between the substrate 2000 and the substrate 3000. The first resonator 100 and the second resonator 200 face each other across the substrate 3000. The electromagnetic resonance coupler 10 may further include a planar ground 1000a and a planar ground 2000a. The planar ground 1000a and the first resonator 100 face each other across the substrate 1000. The planar ground 1000a covers at least the first resonator 100 and a region surrounded by the first resonator 100, when viewed from the Z-axis direction. The planar ground 2000a and the second resonator 200 face each other across the substrate 2000. The planar ground 2000a covers at least the second resonator 200 and a region surrounded by the second resonator 200, when viewed from the Z-axis direction. The electromagnetic resonance coupler 10 is formed by, for example, stacking the substrate 1000, on a principal surface of which the sending-side resonator 150 is formed, and the substrate 2000, on a principal surface of which the receiving-side resonator 250 is formed, with the substrate 3000 between the substrates 1000 and 2000.

A region occupied by the first resonator 100 and a region occupied by the second resonator 200 coincide substantially with each other when viewed from the Z-axis direction. In the present disclosure, the term "occupied region" refers to a region which is composed of a region occupied by a body of open loop wiring, a region occupied by an open portion of the open loop wiring, and a region surrounded by the open loop wiring. The expression "a region occupied by an open portion of open loop wiring" refers to, for example, a region between one end and the other end of the open loop wiring. The phrase "coincide substantially" refers to falling within the range of permissible manufacturing variations. Examples of manufacturing variations include variations in size among pieces of wiring and variations in stacking position among a plurality of substrates. In the example shown in FIG. 1, the regions occupied by the first resonator 100 and the second resonator 200 are both rectangular.

Note that even if the region occupied by the first resonator 100 does not coincide with the region occupied by the second resonator 200 when viewed from the Z-axis direction, the electromagnetic resonance coupler 10 can operate. Thus, the region occupied by the first resonator 100 may not coincide with the region occupied by the second resonator 200 as long as an electromagnetic resonance phenomenon occurs between the resonators.

If the region occupied by the first resonator 100 and the region occupied by the second resonator 200 have respective rotational symmetries when viewed from the Z-axis direction, an axis of rotational symmetry of the region occupied by the first resonator 100 may coincide with an axis of rotational symmetry of the region occupied by the second resonator 200. With this configuration, the electromagnetic resonance coupler 10 can efficiently transmit a radio-frequency signal. For example, if the first resonator 100 and the second resonator 200 have the same shapes, the first and second resonators 100 and 200 may be symmetric with respect to a point.

Additionally, the open portion 101 may be away from the open portion 201 by 90 degrees or more about a common axis of rotational symmetry when viewed from the Z-axis direction. This configuration can enhance electromagnetic resonant coupling between the resonators. The electromagnetic resonance coupler 10 can more efficiently transmit a radio-frequency signal.

The interval between the sending-side resonator 150 and the receiving-side resonator 250 is, for example, not more than one-half of the wavelength of a radio-frequency signal propagating through the substrate 3000, that is, a wavelength of a radio-frequency signal which is estimated in view of a rate of wavelength shortening by the substrate 3000. With this configuration, the first resonator 100 and the second resonator 200 can be strongly coupled through electromagnetic resonant coupling in a near-field region. Note that the interval between the sending-side resonator 150 and the receiving-side resonator 250 is not limited to this. How large the interval between the sending-side resonator 150 and the receiving-side resonator 250 is does not matter as long as an electromagnetic resonance phenomenon occurs between the resonators.

[Rectifier and Transmission Device]

Figure 5:
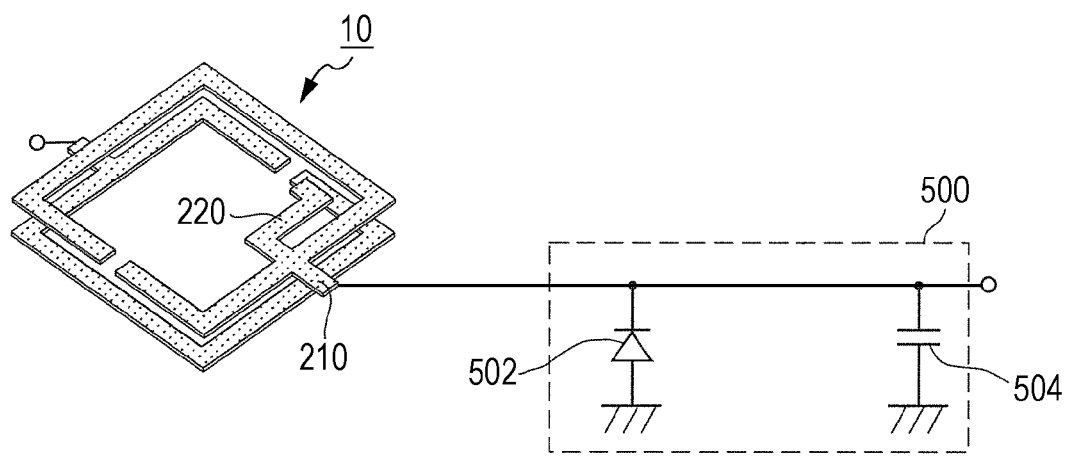
FIG. 5 is a schematic diagram showing a configurational example of a transmission device including the electromagnetic resonance coupler according to the first embodiment and a rectifier.
Figure 6:
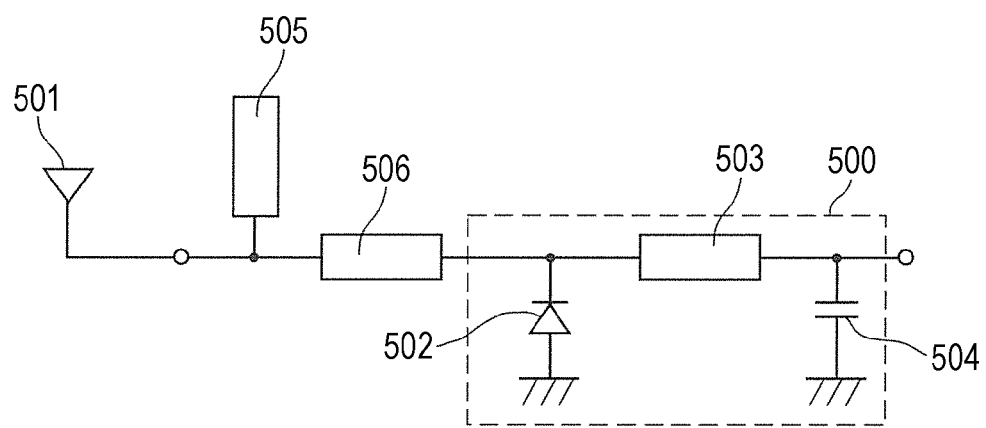
FIG. 6 is a circuit diagram corresponding to the transmission device shown in FIG. 5.

The electromagnetic resonance coupler 10 is used, for example, while the electromagnetic resonance coupler 10 is electrically connected to a rectifier 500. FIG. 5 shows a transmission device including the electromagnetic resonance coupler 10 and the rectifier 500. FIG. 6 is a schematic circuit diagram corresponding to the transmission device shown in FIG. 5.

The configuration of the rectifier 500 will be described. The rectifier 500 rectifies a radio-frequency signal input from the electromagnetic resonance coupler 10. The rectifier 500 shown in FIGS. 5 and 6 is called a single-shunt rectenna. The rectifier 500 can efficiently convert a radio-frequency signal into a DC signal with a simple configuration. The DC signal is, for example, a low-frequency pulse signal corresponding to an envelope of the radio-frequency signal.

As shown in FIG. 5, the rectifier 500 includes a diode 502 and a capacitor 504.

An anode of the diode 502 is grounded while a cathode of the diode 502 is electrically connected to the output wiring 210 of the electromagnetic resonance coupler 10 via a line. The capacitor 504 is connected in parallel to the diode 502. In other words, one end of the capacitor 504 is grounded while the other end is electrically connected to the cathode of the diode 502 via a line. With this configuration, the rectifier 500 can output a positive voltage. Note that if the diode 502 is oppositely oriented, the rectifier 500 can output a negative voltage.

The second resonator 200 corresponds to an antenna 501 in FIG. 6, and the stub wiring 220 corresponds to a line 505 in FIG. 6. In FIG. 6, each line is indicated by a rectangular symbol. To be exact, each line refers to the whole of a conductive path extending between predetermined nodes. The line 505 corresponds to a line from the open end 240 to the other end of the stub wiring 220. A line 506 corresponds to a line from the connection portion 230 of the second resonator 200 to the cathode of the diode 502. A line 503 corresponds to a line connecting the cathode of the diode 502 and the one end of the capacitor 504. The length of the line 503 is, for example, one-quarter of the wavelength of a radio-frequency signal. The length of the line 505 is one-quarter of the wavelength of an nth-order harmonic of a radio-frequency signal, where n is an integer not less than 2.

The length of the line 506 is an odd multiple of one-quarter of the wavelength of the nth-order harmonic.

A case where the radio-frequency signal is input to the rectifier 500 will be described.

If a radio-frequency signal applied to the diode 502 exhibits a positive voltage, the diode 502 is turned off, and the radio-frequency signal is output to the line 503. At this time, the capacitor 504 is equivalent to being short-circuited, and the one end thereof is grounded. That is, the capacitor 504 serves as a fixed end for the radio-frequency signal. Thus, the radio-frequency signal incident from the line 503 on the capacitor 504 is reflected at the capacitor 504 while inverted in phase. If a positive voltage is incident on the capacitor 504, a negative voltage is emitted as a reflected wave from the capacitor 504. The reflected radio-frequency signal is input to the diode 502 through the line 503.

Since the length of the line 503 is one-quarter of the wavelength of the radio-frequency signal, a time period during the round-trip travel of the radio-frequency signal over the line 503 corresponds to a half of the period of the radio-frequency signal. The radio-frequency signal sequentially input to the diode 502 causes the polarity of a voltage at the diode 502 to change from positive to negative while the half of the period of the radio-frequency signal passes. Thus, when a new component of the radio-frequency signal, which is newly input to the diode 502, exhibits a negative voltage, the reflected wave component of the radio-frequency signal, which has returned to the diode 502, exhibits a negative value. As a result, a large negative voltage is generated at the diode 502 by the superposition of two components of the radio-frequency signal When the negative voltage is applied to the diode 502, the diode 502 is turned on, and the diode 502 rectifies the negative voltage.

That is, the rectifier 500 can gain power higher than in the case of half-wave rectification, because the rectifier 500 uses phase inversion through reflection in the capacitor 504 and a phase difference corresponding to a round-trip distance of the line 503. As a result, the rectifier 500 is capable of voltage doubler rectification and can achieve radio-frequency-to-DC-conversion efficiency equivalent to that in the case of full-wave rectification. Note that the rectified signal is smoothed by the capacitor 504.

[Role of Stub Wiring]

The rectifier 500 converts a radio-frequency signal into a DC signal using non-linearity of the diode 502. For this reason, a radio-frequency signal after being input to the diode 502 includes a harmonic. A phase of harmonic is, however, different from a phase of a fundamental after returned through round-trip travel over the line 503. Thus, harmonic power after round-trip travel over the line 503 is not converted into DC power. The transmission device according to the present embodiment thus efficiently converts harmonic power into DC power with the lines 505 and 506.

An example in which the lines 505 and 506 convert a third-order harmonic into DC will be described.

Assume a case where a radio-frequency signal applied to the diode 502 exhibits a positive voltage, and the diode 502 generates a third-order harmonic having a positive voltage component. The third-order harmonic is incident from the diode 502 on the connection portion 230 of the second resonator 200, and then is reflected at the connection portion 230 while inverted in phase. For example, if a positive voltage is incident on the connection portion 230, a negative voltage is emitted as a reflected wave from the connection portion 230. The reason for reflection in the connection portion 230 is that impedance matching is achieved by the stub wiring 220 having a wiring length which is one-quarter of the wavelength of a third-order harmonic. The reflected third-order harmonic passes through the line 506 and then is input to the diode 502.

The length of the line 506 is set to an odd multiple of one-quarter of the wavelength of a third-order harmonic. Therefore, a time period which is equivalent to an odd multiple of half of the third-order harmonic passes while the third-order harmonic travels one round over the line 506. Thus, when a new component of the third-order harmonic, which is newly generated at the diode 502, exhibits a negative voltage, the reflected wave component of the third-order harmonic, which has returned to the diode 502, exhibits a negative value. As a result, a large negative voltage is generated at the diode 502 by the superposition of two components of the third-order harmonic, thereby turning on the diode 502.

That is, the electromagnetic resonance coupler 10 and the rectifier 500 can increase output power by using harmonic phase inversion through reflection in the connection portion 230 and a harmonic phase difference corresponding to a round-trip distance of the line 506. More specifically, reflection of a harmonic incident on the second resonator 200 by the stub wiring 220 allows inhibition of consumption of harmonic power in the second resonator 200. The line 506 provides an appropriate phase difference to a harmonic and returns the harmonic to the rectifier 500. With this configuration, the rectifier 500 can efficiently use harmonic power.

Additionally, the electromagnetic resonance coupler 10 incorporates the line 505 as the stub wiring 220, which allows miniaturization of a peripheral circuit. In particular, since the stub wiring 220 is located inside the second resonator 200, the stub wiring 220 may not increase the mounting area of the resonator 150. That is, miniaturization of the electromagnetic resonance coupler 10 and a peripheral circuit is implemented.

[Simulation Result]

Figure 7:
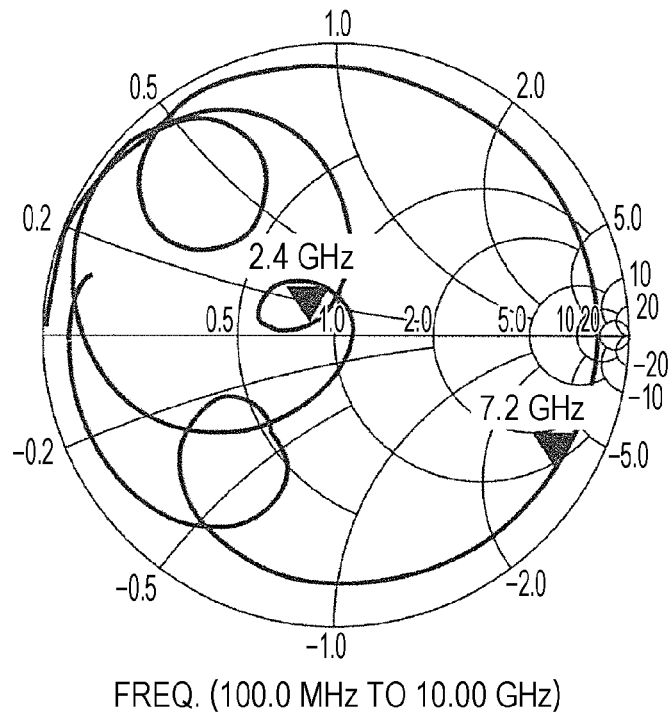
FIG. 7 is a chart showing an example of a reflection characteristic of input wiring in the electromagnetic resonance coupler according to the first embodiment.
Figure 8:
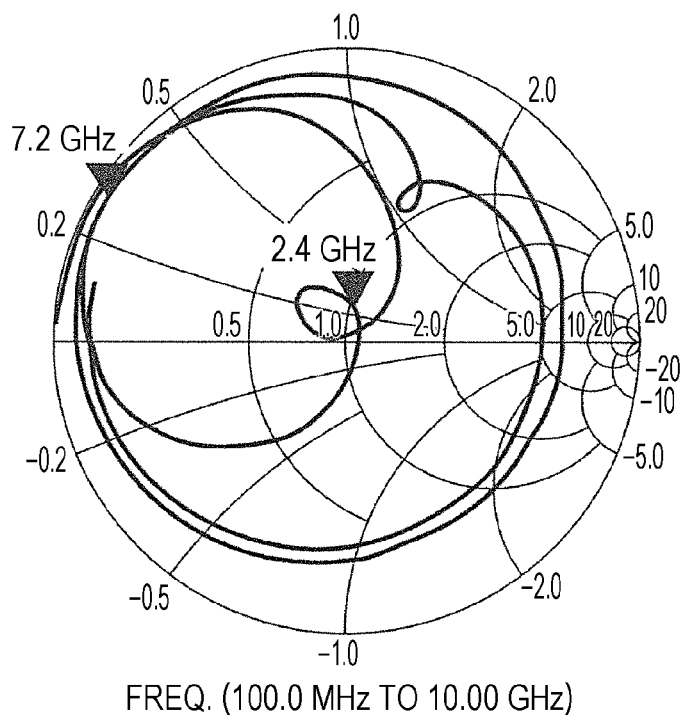
FIG. 8 is a chart showing an example of a reflection characteristic of output wiring in the electromagnetic resonance coupler according to the first embodiment.
Figure 9:
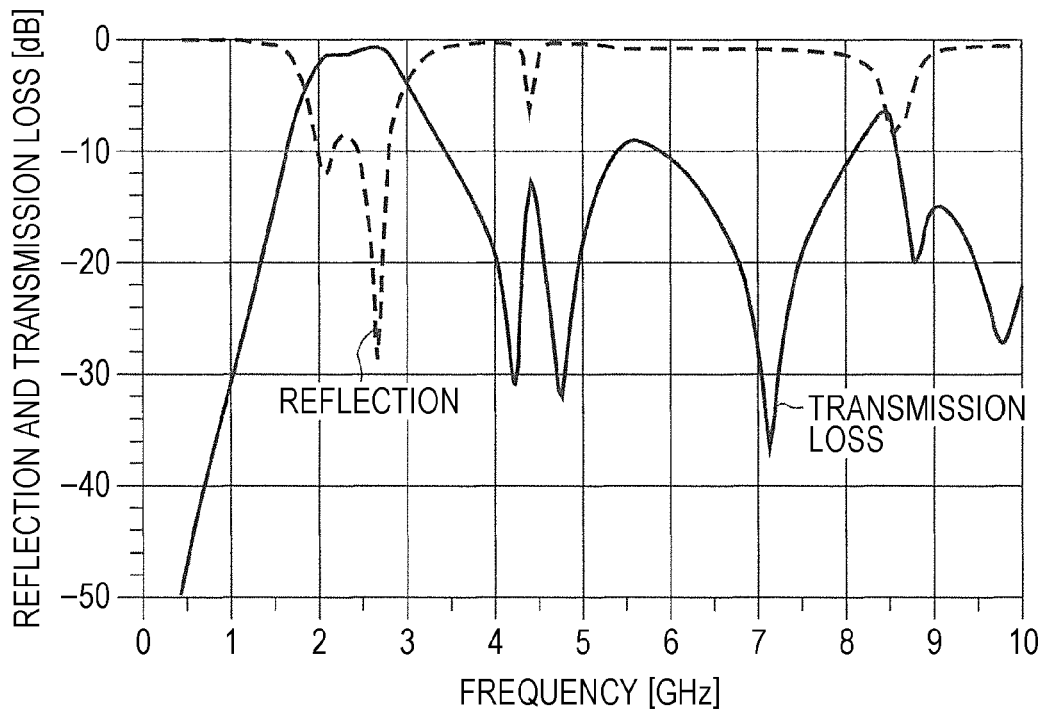
FIG. 9 is a chart showing respective examples of a transmission loss and a reflection characteristic between the input wiring and the output wiring according to the first embodiment.

FIG. 7 shows an example of a reflection characteristic of the input wiring 110 in the electromagnetic resonance coupler 10 that transmits radio-frequency waves of 2.4 GHz. FIG. 8 shows an example of a reflection characteristic of the output wiring 210 in the electromagnetic resonance coupler 10 that transmits radio-frequency waves of 2.4 GHz. FIG. 9 shows respective examples of a transmission loss and a reflection characteristic between the input wiring 110 and the output wiring 210.

As shown in FIGS. 7 and 8, the impedance of the output wiring 210 was matched to 50Ω at 2.4 GHz for a fundamental, regardless of the impedance of the input wiring 110. The impedance of the output wiring 210 was short-circuited at 7.2 GHz for a third-order harmonic, regardless of the impedance of the input wiring 110. That is, the output wiring 210 served as a fixed end for a third-order harmonic.

As shown in FIG. 9, a transmission loss between input and output of the electromagnetic resonance coupler 10 was about 1.5 dB at 2.4 GHz for a fundamental. That is, the electromagnetic resonance coupler 10 can sufficiently reduce a loss in power of a radio-frequency signal.

Figure 10:
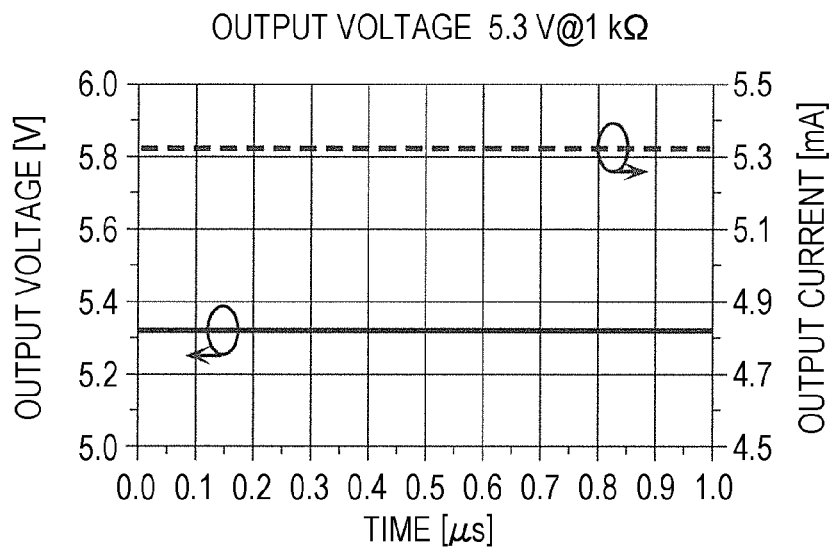
FIG. 10 is a chart showing an example of the relationship between output voltage and output current in a transmission device including a referential electromagnetic resonance coupler and a rectifier.
Figure 11:
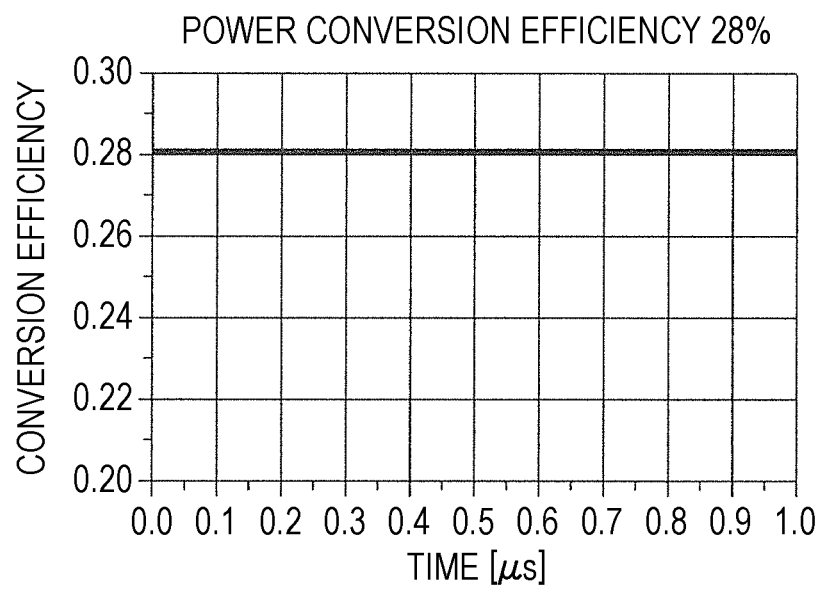
FIG. 11 is a chart showing an example of efficiency in conversion from radio-frequency power into DC power in the transmission device including the referential electromagnetic resonance coupler and the rectifier.
Figure 12:
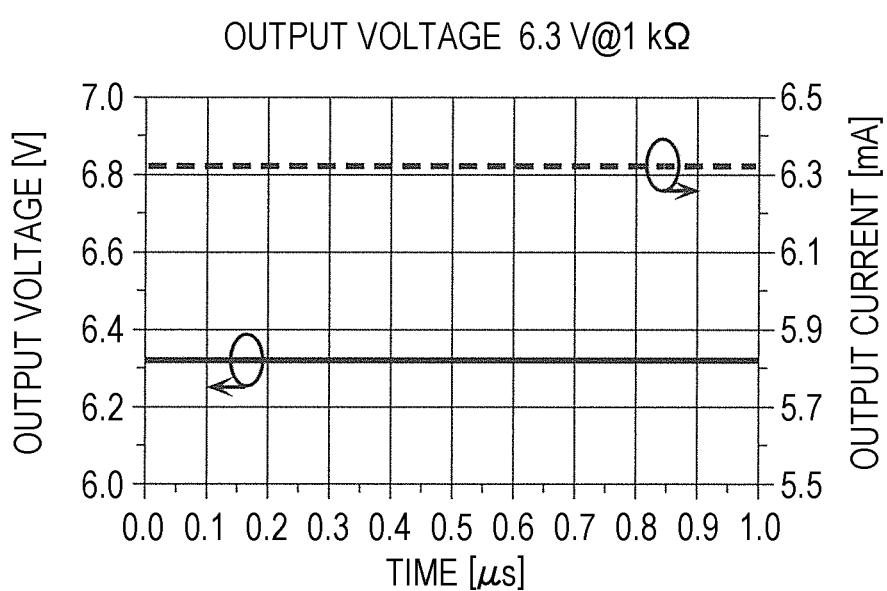
FIG. 12 is a chart showing an example of the relationship between output voltage and output current in the transmission device including the electromagnetic resonance coupler and the rectifier according to the first embodiment.
Figure 13:
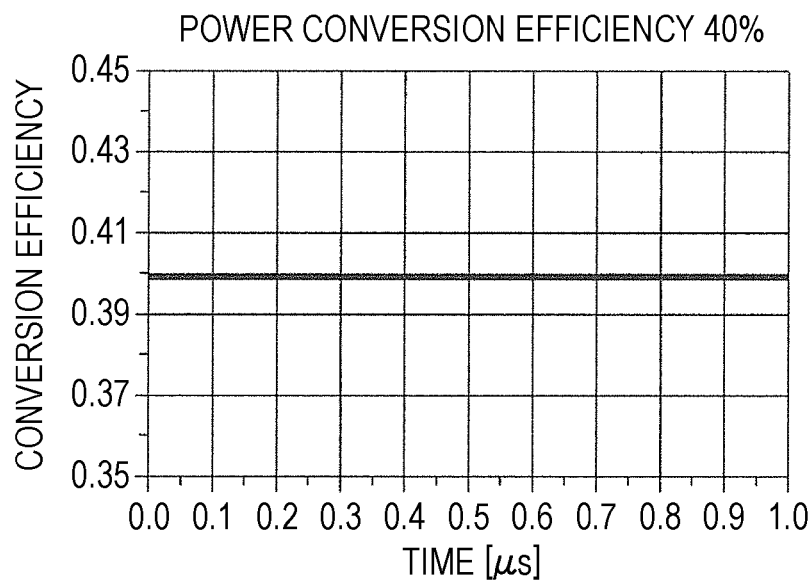
FIG. 13 is a chart showing an example of efficiency in conversion from radio-frequency power into DC power in the transmission device including the electromagnetic resonance coupler and the rectifier according to the first embodiment.

FIG. 10 shows an output voltage and an output current in a transmission device in which a referential electromagnetic resonance coupler and the rectifier 500 are connected. FIG. 11 shows efficiency in conversion from harmonic power into DC power in the rectifier 500 connected to the referential electromagnetic resonance coupler. FIG. 12 shows an output voltage and an output current in the transmission device, in which the electromagnetic resonance coupler 10 and the rectifier 500 are connected. FIG. 13 shows efficiency in conversion from harmonic power into DC power in the rectifier 500 connected to the electromagnetic resonance coupler 10.

The referential electromagnetic resonance coupler was configured to have the same configuration as the electromagnetic resonance coupler 10 except that the electromagnetic resonance coupler does not include stub wiring. A resistor having a resistance of 1 kΩ was connected as a load to an output terminal of the rectifier 500. An output voltage when 100 milliwatts of power was input to input wiring of each electromagnetic resonance coupler was measured.

As shown in FIGS. 10 and 11, in the case of the transmission device including the referential electromagnetic resonance coupler, an output voltage of the rectifier 500 was 5.3 V, and the conversion efficiency in the rectifier 500 was 28%. In contrast, as shown in FIGS. 12 and 13, in the case of the transmission device including the electromagnetic resonance coupler 10, the output voltage of the rectifier 500 was 6.3 V, and the conversion efficiency in the rectifier 500 was 40%.

As described above, the electromagnetic resonance coupler 10 allows improvement in the conversion efficiency of the rectifier 500. In other words, the electromagnetic resonance coupler 10 allows a reduction in power consumption in the rectifier 500. This results in an increase in output power of the rectifier 500. Even if power input to the rectifier 500 is low, sufficient output power is obtained.

Note that the wiring length of the output wiring 210 may be an odd multiple of one-quarter of the wavelength of a harmonic in the electromagnetic resonance coupler 10. In this case, the line 506 serves as the output wiring 210 and is integral with the electromagnetic resonance coupler 10, and thus a circuit configuration can be simpler.

[First Modification]

Various examples in which a sending-side resonator has stub wiring will be described as a first modification.

Figure 14:
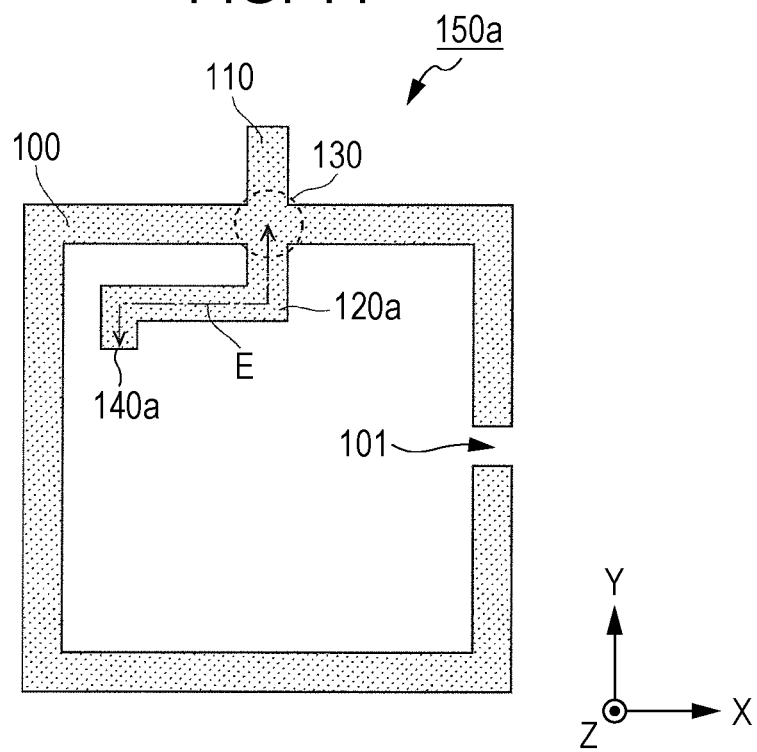
FIG. 14 is a plan view showing the configuration of a sending-side resonator according to a first modification of the first embodiment.

FIG. 14 is a plan view of a sending-side resonator 150*a*. As shown in FIG. 14, the sending-side resonator 150*a* includes stub wiring 120*a*. One end of the stub wiring 120*a* is an open end 140*a* while the other end is a connection end which is connected to the connection portion 130 of the first resonator 100. In FIG. 14, the stub wiring 120*a* is located in a region surrounded by the first resonator 100. The stub wiring 120*a* is bent at a right angle so as to follow the shape of the first resonator 100.

The stub wiring 120*a* reflects a harmonic of a radio-frequency signal input to the input wiring 110. In FIG. 14, a wiring length from the open end 140*a* of the stub wiring 120*a* to the connection portion 130 of the first resonator 100 is referred to as a wiring length E. The wiring length E is, for example, one-quarter of the wavelength of a third-order harmonic of a radio-frequency signal.

Figure 15:
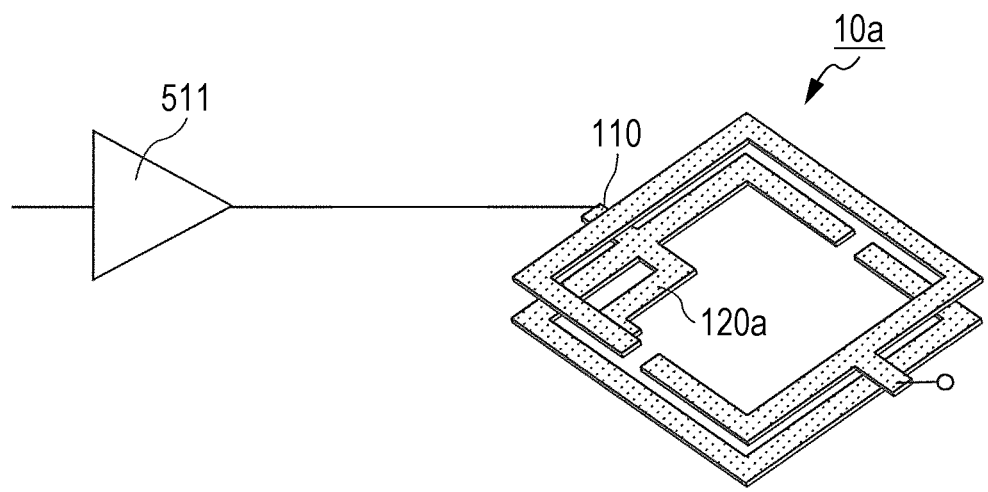
FIG. 15 is a view showing the configuration of a transmission device including the electromagnetic resonance coupler according to the modification of the first embodiment and an amplifier.

An electromagnetic resonance coupler 10*a* which includes the sending-side resonator 150*a* may be used, for example, while the electromagnetic resonance coupler 10*a* is electrically connected to an amplifier 511. FIG. 15 shows a transmission device which includes the amplifier 511 and the electromagnetic resonance coupler 10*a*. In FIG. 15, in the electromagnetic resonance coupler 10*a*, a sending-side resonator includes the stub wiring 120*a*, and a receiving-side resonator does not include stub wiring. In this case, the sending-side resonator of the electromagnetic resonance coupler 10*a* is an example of "first resonance wiring" while the receiving-side resonator of the electromagnetic resonance coupler 10*a* is an example of "second resonance wiring".

For example, the stub wiring 120*a* may be used as an open stub for adjusting the impedance of the amplifier 511. This allows a reduction in the circuit size of the amplifier 511. For example, if the amplifier 511 is a class-F amplifier, the stub wiring 120*a* may be designed so as to serve as an open end for at least one odd-order harmonic.

Figure 16:
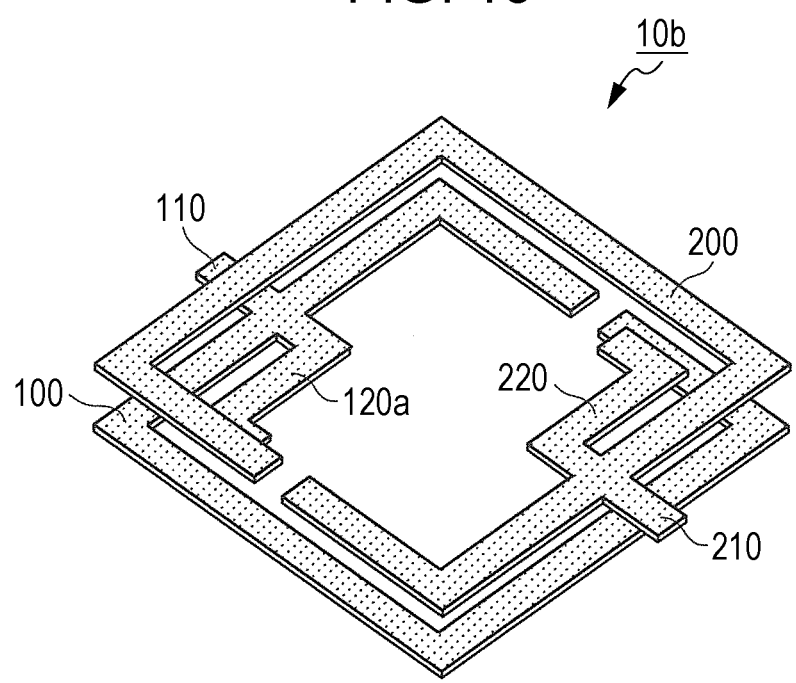
FIG. 16 is an external perspective view showing the structure of wiring included in an electromagnetic resonance coupler according to a different modification of the first embodiment.

Note that stub wiring may be provided both at a sending-side resonator and at a receiving-side resonator. FIG. 16 is a perspective view showing the structure of wiring included in an electromagnetic resonance coupler 10*b*. The electromagnetic resonance coupler 10*b* includes the sending-side resonator 150 that has the stub wiring 120*a* and the receiving-side resonator 250 that has the stub wiring 220.

[Second Modification]

Various examples in which stub wiring has a different shape will be described as a second modification.

Figure 17:
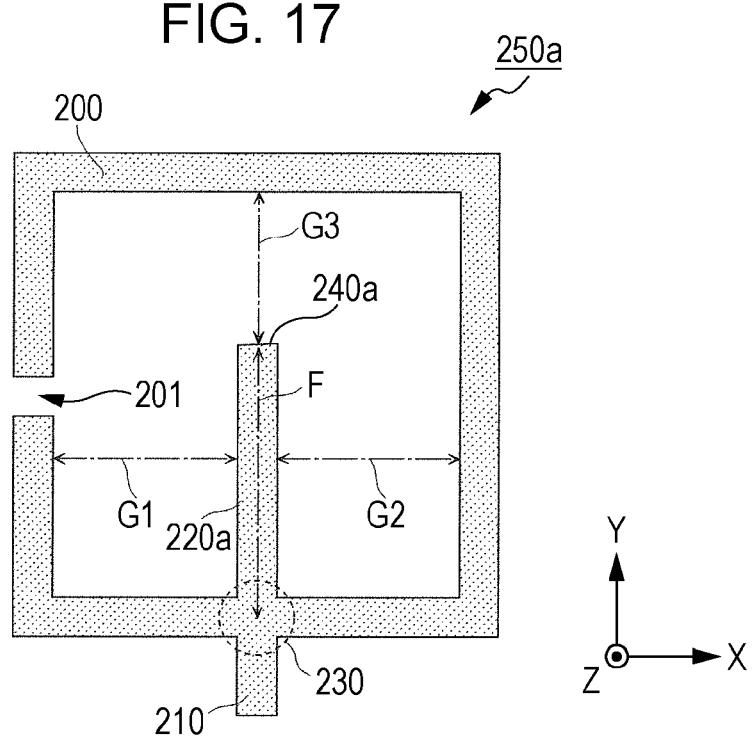
FIG. 17 is a plan view of a receiving-side resonator of the electromagnetic resonance coupler according to a second modification of the first embodiment.

FIG. 17 is a plan view of a receiving-side resonator 250*a*. The receiving-side resonator 250*a* includes linear stub wiring 220*a* which extends in a Y direction.

One end of the stub wiring 220*a* is an open end 240*a* while the other end is a connection end which is connected to the connection portion 230 of the second resonator 200. The wiring length of the stub wiring 220*a* is, for example, one-quarter of the wavelength of a third-order harmonic of a radio-frequency signal. In FIG. 17, two intervals between the second resonator 200 and the stub wiring 220*a* in an X direction are denoted by reference characters G1 and G2. An interval between the second resonator 200 and the stub wiring 220*a* in the Y direction is denoted by reference character G3. The intervals G1 and G2 are, for example, not less than one-half of the wiring width. This configuration allows a reduction in a capacitance between the second resonator 200 and the stub wiring 220*a*, thereby enabling improvement in a transmission characteristic between input and output of the electromagnetic resonance coupler.

In each of the electromagnetic resonance couplers described thus far, a connection end of stub wiring and a connection end of input/output wiring are located adjacent to each other across open loop wiring. In this case, a line length from a cathode of a diode of the rectifier 500 to an open end of the stub wiring can be easily designed with high accuracy. Alternatively, in open loop wiring, a connection portion to which stub wiring is connected and a connection portion to which input/output wiring is connected may be away from each other.

Figure 18:
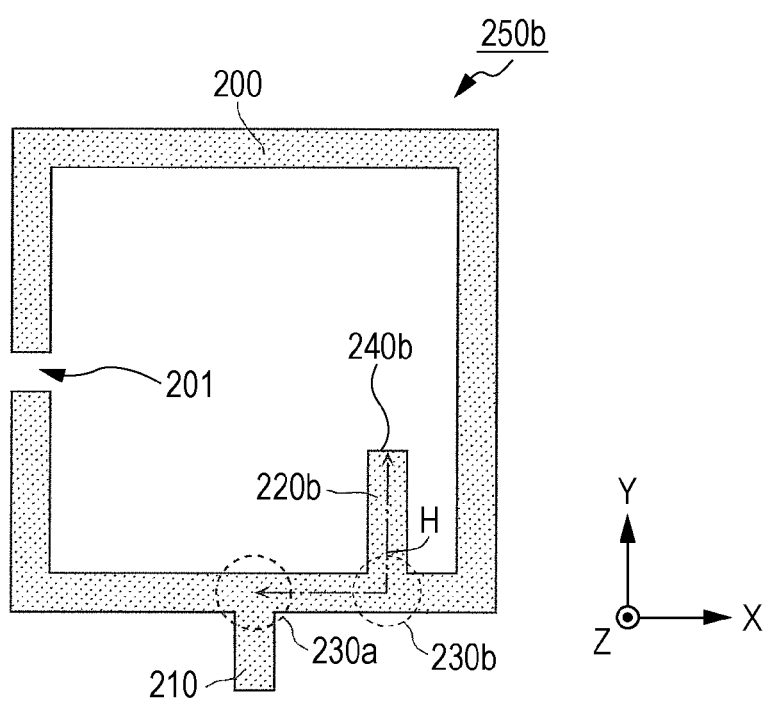
FIG. 18 is a plan view of a receiving-side resonator of the electromagnetic resonance coupler according to the second modification of the first embodiment.

FIG. 18 is a plan view of a receiving-side resonator 250*b*. In the receiving-side resonator 250*b*, the output wiring 210 is connected to a connection portion 230*a* of the second resonator 200, and stub wiring 220*b* is connected to a connection portion 230*b* of the second resonator 200. The connection portion 230*a* and the connection portion 230*b* are at different locations. A wiring length H from an open end 240*b* of the stub wiring 220*b* to the connection portion 230*a* of the second resonator 200 is one-quarter of the wavelength of an nth-order harmonic of a radio-frequency signal. The wavelength of a harmonic here is, for example, an effective wavelength which is obtained in view of capacitive coupling between the stub wiring 220*b* and the second resonator 200. The nth-order harmonic may be, for example, a third-order harmonic.

For example, a wiring length between the connection portion 230*a* and the connection portion 230*b* is not less than 0 mm and is not more than 80% of the wiring length H from the open end 240*b* to the connection portion 230*a*. The stub wiring 220*b* is shorter than, for example, the stub wiring 220 described with reference to FIG. 3 depending on the wiring length.

[Third Modification]

An example in which open loop wiring has a different shape will be described as a third modification.

Figure 19:
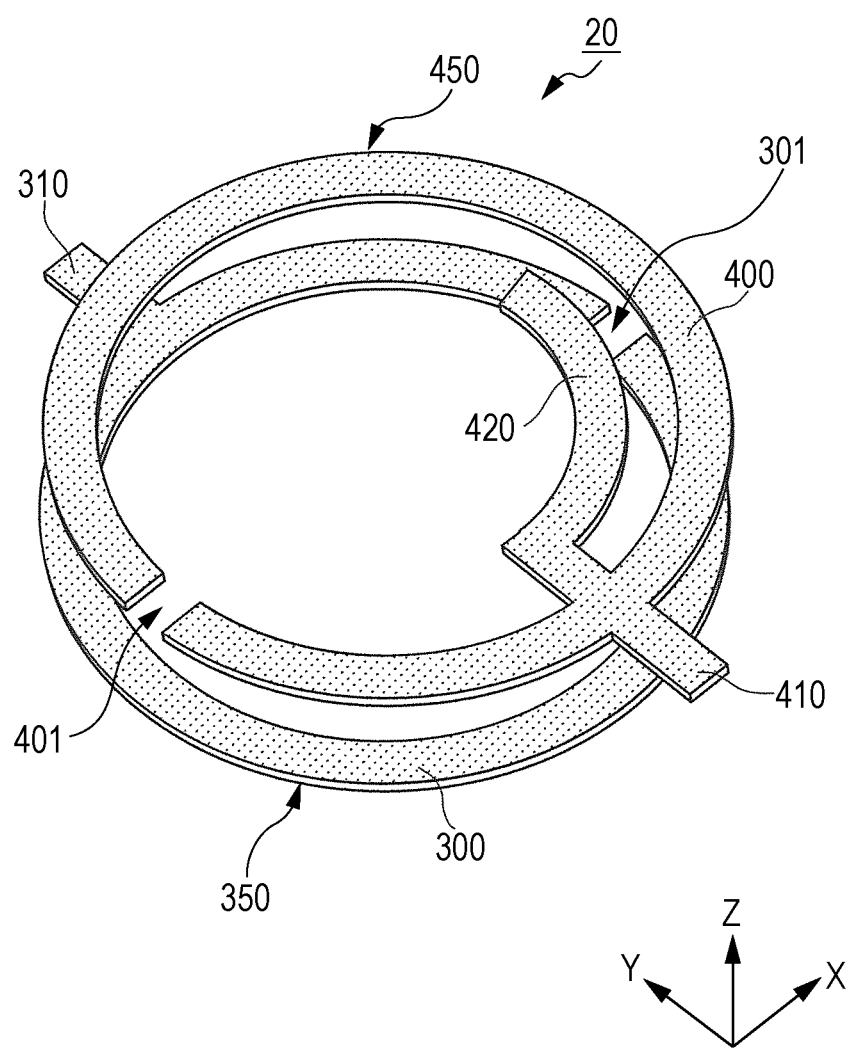
FIG. 19 is an external perspective view showing the structure of wiring included in an electromagnetic resonance coupler according to a third modification of the first embodiment.

FIG. 19 is a perspective view showing the structure of wiring included in an electromagnetic resonance coupler 20. The electromagnetic resonance coupler 20 includes a sending-side resonator 350 and a receiving-side resonator 450. The sending-side resonator 350 includes a first resonator 300 and input wiring 310. The first resonator 300 is a piece of circular wiring which has an open portion 301. The receiving-side resonator 450 includes a second resonator 400, output wiring 410, and stub wiring 420. The second resonator 400 is a piece of circular wiring which has an open portion 401. The stub wiring 420 has an arc-like wiring portion which is curved along the second resonator 400.

The circular first resonator 300 and second resonator 400 have no angulate portion. Thus, field emission from an angulate portion ca be reduced, and thereby a transmission characteristic between input and output of the electromagnetic resonance coupler 20 can be improved. Note that the expression "a shape with no angulate portion" refers to, for example, a shape obtained by rounding angulate portions of the first resonator 100 or the second resonator 200 shown in FIG. 1.

[Fourth Modification]

An example in which one end of open loop wiring is grounded will be described as a fourth modification.

In the sending-side resonator 150, for example, the one end 102 of the first resonator 100 may be grounded, and the wiring length of the first resonator 100 may be one-quarter of the wavelength of a radio-frequency signal. In the receiving-side resonator 250, for example, the one end 202 of the second resonator 200 may be grounded, and the wiring length of the second resonator 200 may be one-quarter of the wavelength of a radio-frequency signal. This configuration allows miniaturization of the electromagnetic resonance coupler 10.

[Fifth Modification]

An example in which a connection portion to which input/output wiring is connected has a different location will be described as a fifth modification.

In the receiving-side resonator 250, for example, the connection portion 230 may be located such that a wiring length from the one end 202 of the second resonator 200 to the connection portion 230 is one-quarter of the wavelength of a second-order harmonic of a radio-frequency signal. With this location, a second-order harmonic incident from the rectifier 500 can be reflected to the rectifier 500 when the rectifier 500 is electrically connected to the electromagnetic resonance coupler 10. This allows improvement in efficiency in conversion from radio-frequency power into DC power in the rectifier 500.

[Supplement]

A supplemental explanation of a method for manufacturing the electromagnetic resonance coupler 10 will be given. The electromagnetic resonance coupler 10 may be manufactured by a conventional technique for manufacturing a dielectric substrate and a printed board manufacturing technique.

The first resonator 100 and the input wiring 110 may be formed by forming metal foil on an upper surface of the substrate 1000 and then patterning the metal foil into an arbitrary shape through etching. The second resonator 200, the output wiring 210, and the stub wiring 220 may be formed by forming metal foil on an upper surface of the substrate 2000 and then patterning the metal foil into an arbitrary shape through etching. For example, the metal foil may be copper foil and has a thickness of 35 μm. For example, the substrates 1000 and 2000 may be made of a polyphenylene ether resin (PPE resin) highly filled with a high-dielectric filler, and may have thicknesses of 300 μm. For example, the dielectric constant of the PPE resin may be 10, and the dielectric field breakdown strength of the PPE resin may be 20 kV/mm.

If the frequency of a radio-frequency signal is 2.4 GHz, for example, the circumferential lengths of the first resonator 100 and the second resonator 200 may be about 6 mm, and the wiring widths may be 150 μm.

The substrates 1000, 3000, and 2000 are then stacked. At this time, the first resonator 100 and the second resonator 200 may face each other across the substrate 3000. The substrate 3000 may be, for example, the same as the substrates 1000 and 2000. The substrates may be bonded together by pressing.

Note that although not shown, a through-hole may be formed in a laminated substrate including the substrates 1000, 2000, and 3000 using a drill, and then a metal coating may be applied to inside the through-hole. With this configuration, a pad for a sending circuit is electrically connected to the input wiring 110, and a pad for a receiving circuit is electrically connected to the output wiring 210, through the through-hole.

Note that the substrates 1000, 2000, and 3000 may each be a substrate of any other material. For example, the substrates 1000, 2000, and 3000 may be sapphire substrates. The use of sapphire substrates can achieve a high dielectric voltage. Note that the electromagnetic resonance coupler 10 may be manufactured by any other manufacturing method instead of a printed board manufacturing technique. The electromagnetic resonance coupler 10 may be manufactured using, for example, semiconductor processes.

Second Embodiment

An electromagnetic resonance coupler according to a second embodiment can separately and isolatedly transmit two radio-frequency signals with one element.

[Wiring Structure]

Figure 20:
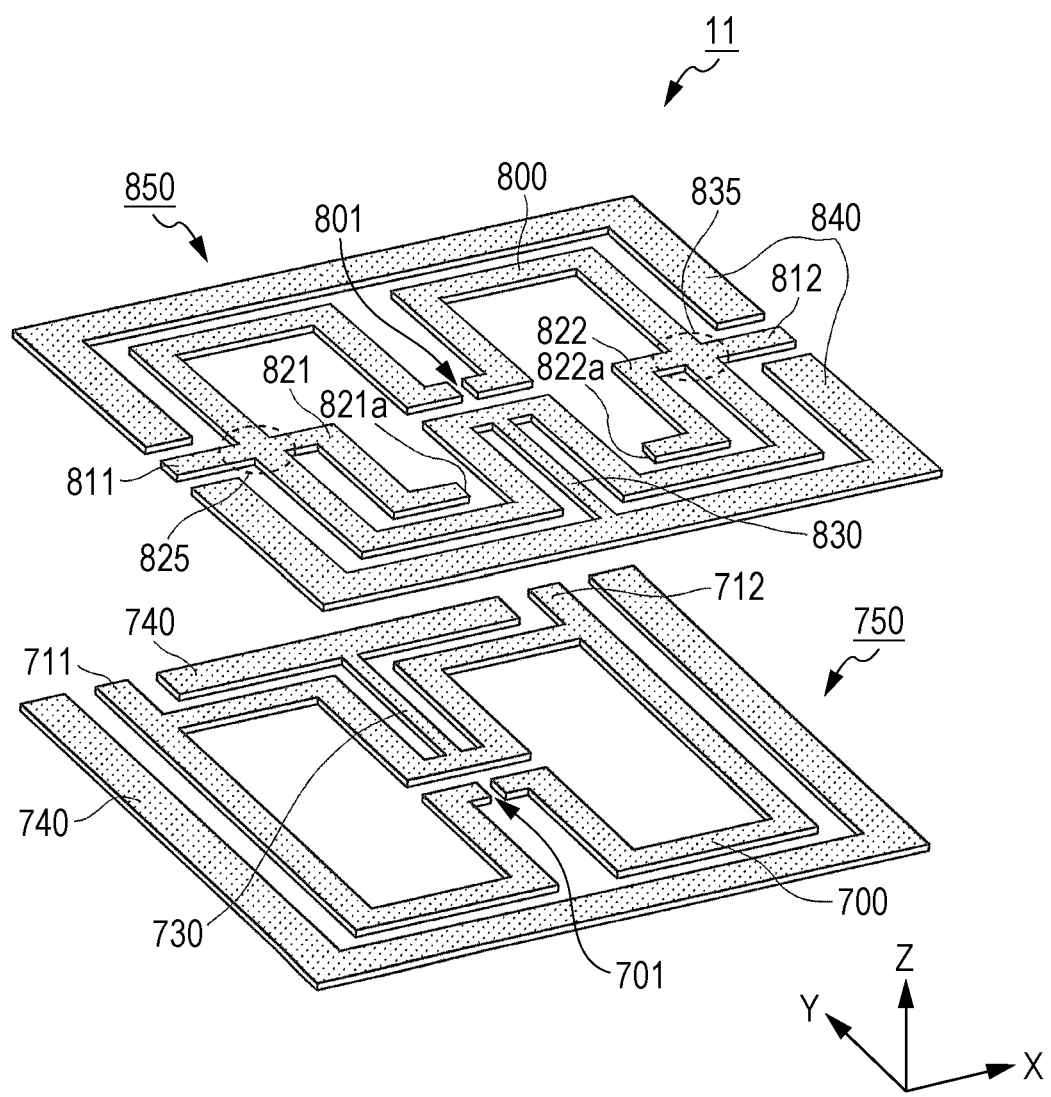
FIG. 20 is an external perspective view showing a structural example of wiring of an electromagnetic resonance coupler according to a second embodiment.

FIG. 20 is an external perspective view showing the structure of wiring included in an electromagnetic resonance coupler 11 according to the second embodiment. The electromagnetic resonance coupler 11 includes a sending-side resonator 750 and a receiving-side resonator 850. The sending-side resonator 750 is an example of "second resonance wiring" while the receiving-side resonator 850 is an example of "first resonance wiring".

The sending-side resonator 750 includes a first resonator 700, first input wiring 711, second input wiring 712, first connection wiring 730, and first ground wiring 740. The first resonator 700 is an example of "second open loop wiring", the first input wiring 711 is an example of "first input wiring", and the second input wiring 712 is an example of "second input wiring".

The first resonator 700 is a piece of looped wiring and has an open portion 701 at which the first resonator 700 is partially opened. The first resonator 700 surrounds a zygal region which is composed of two rectangular regions and a region connecting the two rectangular regions. The first input wiring 711 and the second input wiring 712 are connected to the first resonator 700.

One end of the first connection wiring 730 is connected to a grounding portion of the first resonator 700 while the other end is connected to the first ground wiring 740. A wiring length from the grounding portion to the first input wiring 711 is equal to a wiring length from the grounding portion to the second input wiring 712. The first ground wiring 740 gives a reference potential for a radio-frequency signal to the first resonator 700 via the first connection wiring 730. The first ground wiring 740 surrounds the first resonator 700. Note that the other end of the first connection wiring 730 may, for example, be connected to a planar ground through a conductive via instead of being connected to the first ground wiring 740. In this case, a distance from the first ground wiring 740 to the first resonator 700 is shorter, which allows a reduction in a transmission loss of the electromagnetic resonance coupler 11.

The receiving-side resonator 850 includes a second resonator 800, first output wiring 811, second output wiring 812, second connection wiring 830, second ground wiring 840, stub wiring 821, and stub wiring 822. The second resonator 800 is an example of "first open loop wiring". The first output wiring 811 is an example of "first output wiring", and the second output wiring 812 is an example of "second output wiring". The stub wiring 821 is an example of "first stub wiring", and the stub wiring 822 is an example of "second stub wiring". The second connection wiring 830 is an example of "grounding wiring". Note that the grounding wiring may be, for example, a conductive via. In this case, a distance from the second ground wiring 840 to the second resonator 800 is shorter, which allows a reduction in a transmission loss of the electromagnetic resonance coupler 11.

The second resonator 800 is a piece of looped wiring and has an open portion 801 at which the second resonator 800 is partially opened. The second resonator 800 surrounds a zygal region which is composed of two rectangular regions and a region connecting the two rectangular regions. The wiring length of the second resonator 800 is one-half of the wavelength of a radio-frequency signal.

The first output wiring 811 is connected to a connection portion 825 of the second resonator 800, and the second output wiring 812 is connected to a connection portion 835 of the second resonator 800. In the example shown in FIG. 20, the connection portion 825 is located at a midpoint of a piece of wiring which extends from one end to a grounding portion of the second resonator 800. The connection portion 835 is located at a midpoint of a piece of wiring which extends from the other end to the grounding portion of the second resonator 800. A wiring length from the one end to the connection portion 825 of the second resonator 800, a wiring length from the grounding portion to the connection portion 825 of the second resonator 800, a wiring length from the other end to the connection portion 835 of the second resonator 800, and a wiring length from the grounding portion to the connection portion 835 of the second resonator 800 are all one-eighth of the wavelength of a radio-frequency signal. In other words, the wiring lengths are one-quarter of the wavelength of a second-order harmonic of a radio-frequency signal. In this case, a piece of wiring which extends from the one end to the connection portion 825 of the second resonator 800 and a piece of wiring which extends from the other end to the connection portion 835 of the second resonator 800 function as open stubs for a second-order harmonic of a radio-frequency signal. A piece of wiring which extends from the grounding portion to the connection portion 825 of the second resonator 800 and a piece of wiring which extends from the grounding portion to the connection portion 835 of the second resonator 800 function as short stubs for a second-order harmonic of a radio-frequency signal. With this configuration, the electromagnetic resonance coupler 11 can improve efficiency in conversion from radio-frequency power into DC power using second-order harmonic power.

Note that connection locations of the first output wiring 811 and the second output wiring 812 are not limited to the above-described ones. That is, in the electromagnetic resonance coupler according to the second embodiment, it is not essential to provide a portion of open loop wiring with a stub function.

One end of the second connection wiring 830 is connected to the grounding portion of the second resonator 800 while the other end is connected to the second ground wiring 840. The grounding portion is located such that a wiring length from the one end of the second resonator 800 to the grounding portion is one-quarter of the wavelength of a radio-frequency signal. In this case, a wiring length from the other end of the second resonator 800 to the grounding portion is also one-quarter of the wavelength of a radio-frequency signal. The wiring length from the grounding portion to the connection portion 825 is equal to the wiring length from the grounding portion to the connection portion 835. The second ground wiring 840 gives a reference potential for a radio-frequency signal to the second resonator 800 via the second connection wiring 830. The second ground wiring 840 surrounds the second resonator 800. Note that the other end of the second connection wiring 830 may, for example, be connected to a planar ground through a conductive via instead of being connected to the second ground wiring 840.

One end of the stub wiring 821 is an open end 821a, and the other end is connected to the connection portion 825 of the second resonator 800. A wiring length from the open end 821a of the stub wiring 821 to the connection portion 825 of the second resonator 800 is one-quarter of the wavelength of an nth-order harmonic of a radio-frequency signal. One end of the stub wiring 822 is an open end 822a, and the other end is connected to the connection portion 835 of the second resonator 800. A wiring length from the open end 822a of the stub wiring 822 to the connection portion 835 of the second resonator 800 is one-quarter of an nth-order harmonic of a radio-frequency signal, where n is an integer not less than 2. The nth-order harmonic is, for example, a third-order harmonic. With this configuration, the electromagnetic resonance coupler 11 can improve efficiency in conversion from radio-frequency power into DC power using harmonic power, like the electromagnetic resonance coupler 10 according to the first embodiment.

For example, the first output wiring 811 and the second output wiring 812 are arranged symmetrically with respect to a straight line passing through the open portion 801 and the grounding portion of the second resonator 800. For example, the stub wiring 821 and the stub wiring 822 are arranged symmetrically with respect to the straight line passing through the open portion 801 and the grounding portion of the second resonator 800. With this configuration, the electromagnetic resonance coupler 11 can output two radio-frequency signals in synchronization.

[Operation]

In the electromagnetic resonance coupler 11, a first radio-frequency signal input to the first input wiring 711 is output from the first output wiring 811 while a second radio-frequency signal input to the second input wiring 712 is output from the second output wiring 812. As described above, the first radio-frequency signal and the second radio-frequency signal are separately and isolatedly transmitted.

In the electromagnetic resonance coupler 11, the first resonator 700 and the second resonator 800 are grounded at the respective grounding portions. For this reason, the electromagnetic resonance coupler 11 can resonate a radio-frequency signal with a piece of wiring having a wiring length which is one-quarter of the wavelength of a radio-frequency signal.

Figure 21:
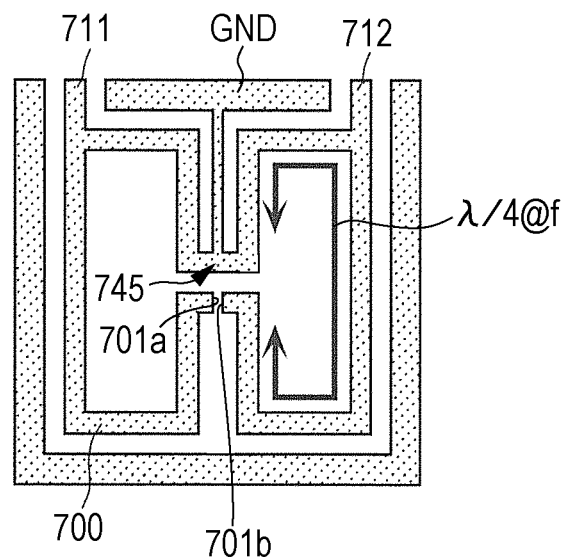
FIG. 21 is a plan view of a sending-side resonator of the electromagnetic resonance coupler according to the second embodiment.
Figure 22:
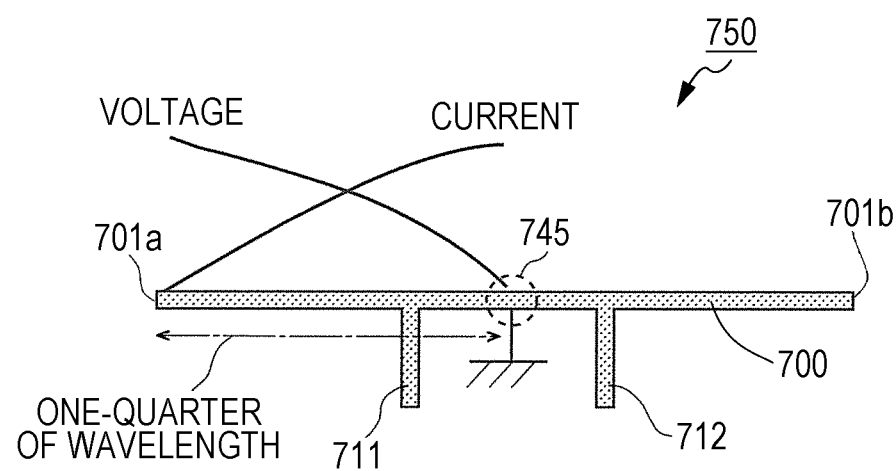
FIG. 22 is a schematic diagram showing the correspondence between the sending-side resonator of the electromagnetic resonance coupler according to the second embodiment and distributions of current and voltage.

FIG. 21 is a plan view of the sending-side resonator 750. FIG. 22 shows the sending-side resonator 750 when the first resonator 700 is straightened and distributions of current and voltage throughout the first resonator 700.

The first resonator 700 may be regarded as two resonators which are located adjacent to each other across a grounding portion 745 and the open portion 701. In other words, the first resonator 700 includes a resonator which extends from an open end 701a to the grounding portion 745 and a resonator which extends from an open end 701b to the grounding portion 745. As shown in FIG. 21, the wiring lengths of the two resonators are each one-quarter of the wavelength of a radio-frequency signal.

The grounding portion 745 functions as a fixed end. More specifically, as shown in FIG. 22, the grounding portion 745 has a current at its maximum and a voltage of 0 when a radio-frequency signal resonates in the first resonator 700. A resonator having a wiring length which is one-quarter of the wavelength of a radio-frequency signal can thus resonate a radio-frequency signal, like a resonator having a wiring length which is one-half of the wavelength of a radio-frequency signal (for example, the first resonator 100 shown in FIG. 1).

Note that the receiving-side resonator 850 can resonate a radio-frequency signal with a wiring length which is one-quarter of the wavelength of the radio-frequency signal, like the sending-side resonator 750.

[Simulation Result]

Figure 23:
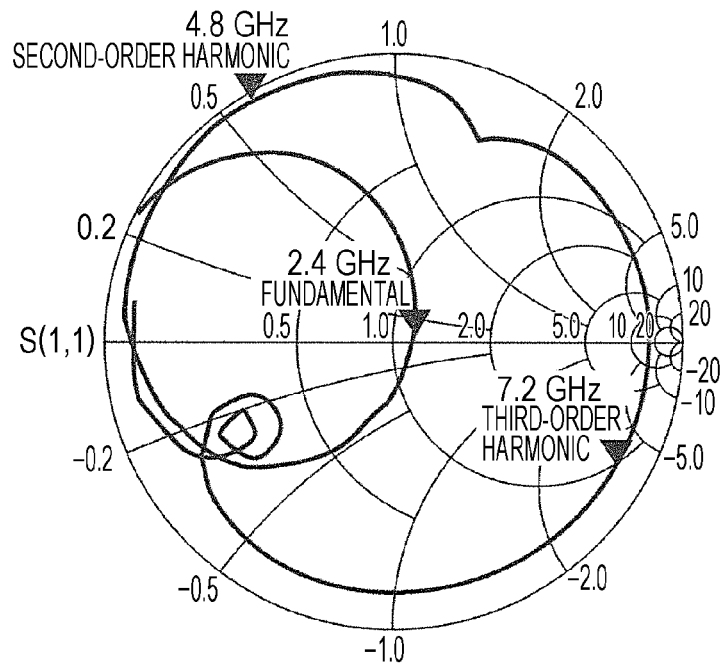
FIG. 23 is a chart showing an example of a reflection characteristic of first input wiring in the electromagnetic resonance coupler according to the second embodiment.
Figure 24:
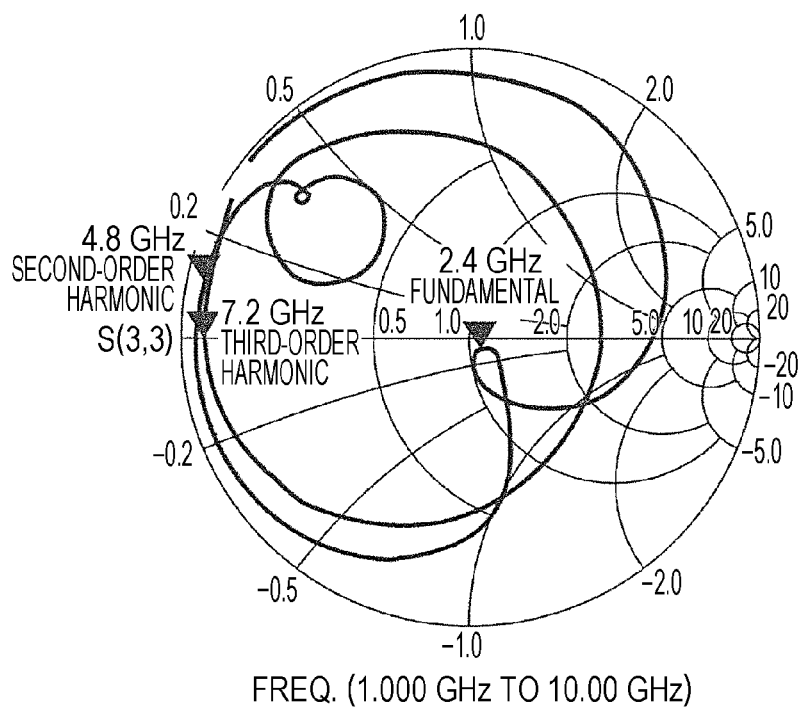
FIG. 24 is a chart showing an example of a reflection characteristic of first output wiring in the electromagnetic resonance coupler according to the second embodiment.
Figure 25:
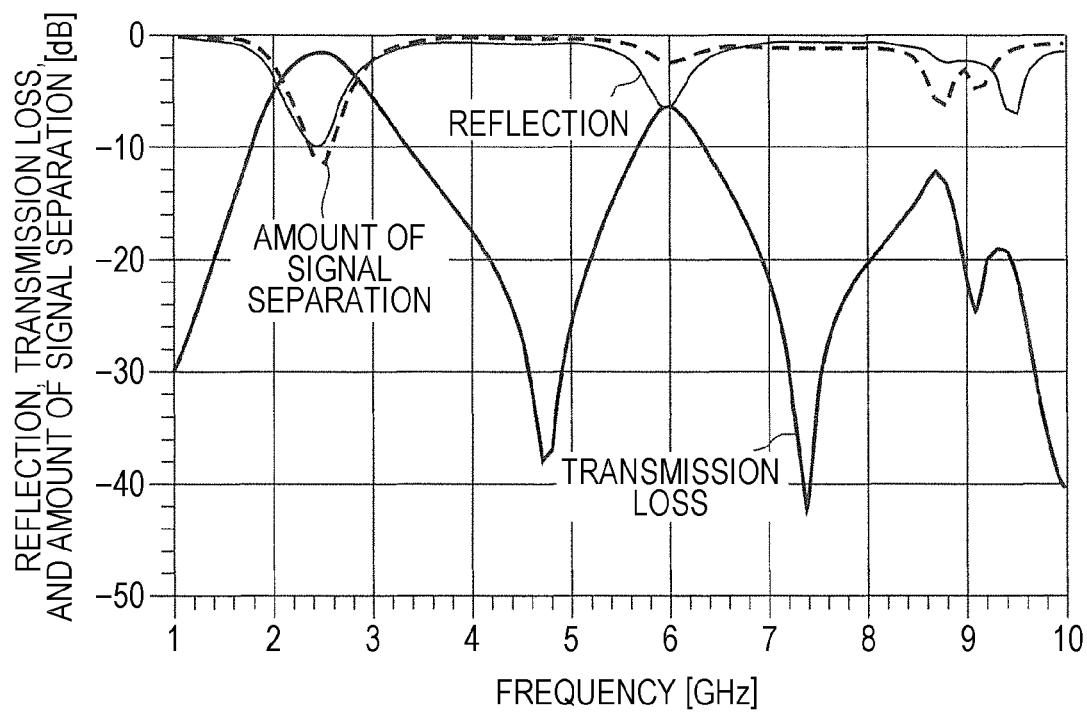
FIG. 25 is a chart showing respective examples of a transmission loss and a reflection characteristic between the first input wiring and the first output wiring of the electromagnetic resonance coupler according to the second embodiment.

FIG. 23 shows an example of a reflection characteristic of the first input wiring 711 in the electromagnetic resonance coupler 11 that transmits radio-frequency waves of 2.4 GHz. FIG. 24 shows an example of a reflection characteristic of the first output wiring 811 in the electromagnetic resonance coupler 11 that transmits radio-frequency waves of 2.4 GHz. FIG. 25 is a chart showing respective examples of a transmission loss and a reflection characteristic between the first input wiring 711 and the first output wiring 811. Note that the wiring length of the stub wiring 821 and that of the stub wiring 822 are one-quarter of the wavelength of a third-order harmonic of a radio-frequency signal.

As shown in FIGS. 23 and 24, the impedance of the first output wiring 811 was matched to 50Ω at 2.4 GHz for a fundamental, regardless of the impedance of the first input wiring 711.

The impedance of the first output wiring 811 was short-circuited at 4.8 GHz for a second-order harmonic, regardless of the impedance of the first input wiring 711. That is, the first output wiring 811 served as a fixed end for a second-order harmonic. This is because the wiring length from the connection portion 825, to which the first output wiring 811 is connected, to the open end of the second resonator 800 is one-quarter of the wavelength of a second-order harmonic of a radio-frequency signal.

The impedance of the first output wiring 811 was short-circuited at 7.2 GHz for a third-order harmonic, regardless of the impedance of the first input wiring 711. That is, the first output wiring 811 served as a fixed end for a third-order harmonic. This is because the wiring length of the stub wiring 821 is one-quarter of the wavelength of a third-order harmonic of a radio-frequency signal.

As shown in FIG. 25, a transmission loss of the electromagnetic resonance coupler 11 was about 1.7 dB at 2.4 GHz for a fundamental. That is, the electromagnetic resonance coupler 11 can sufficiently reduce a loss in power of a radio-frequency signal.

The electromagnetic resonance coupler 11 with the above-described configuration can reflect a second-order harmonic and a third-order harmonic to a rectifier 500, for example, if the rectifier 500 is electrically connected to the electromagnetic resonance coupler 11. This allows improvement in efficiency in conversion from radio-frequency power into DC power in the rectifier 500. The electromagnetic resonance coupler 11 can separately transmit two radio-frequency signals with a small mounting area.

[First Modification]

An example in which a receiving-side resonator has a different shape will be described as a first modification.

Figure 26:
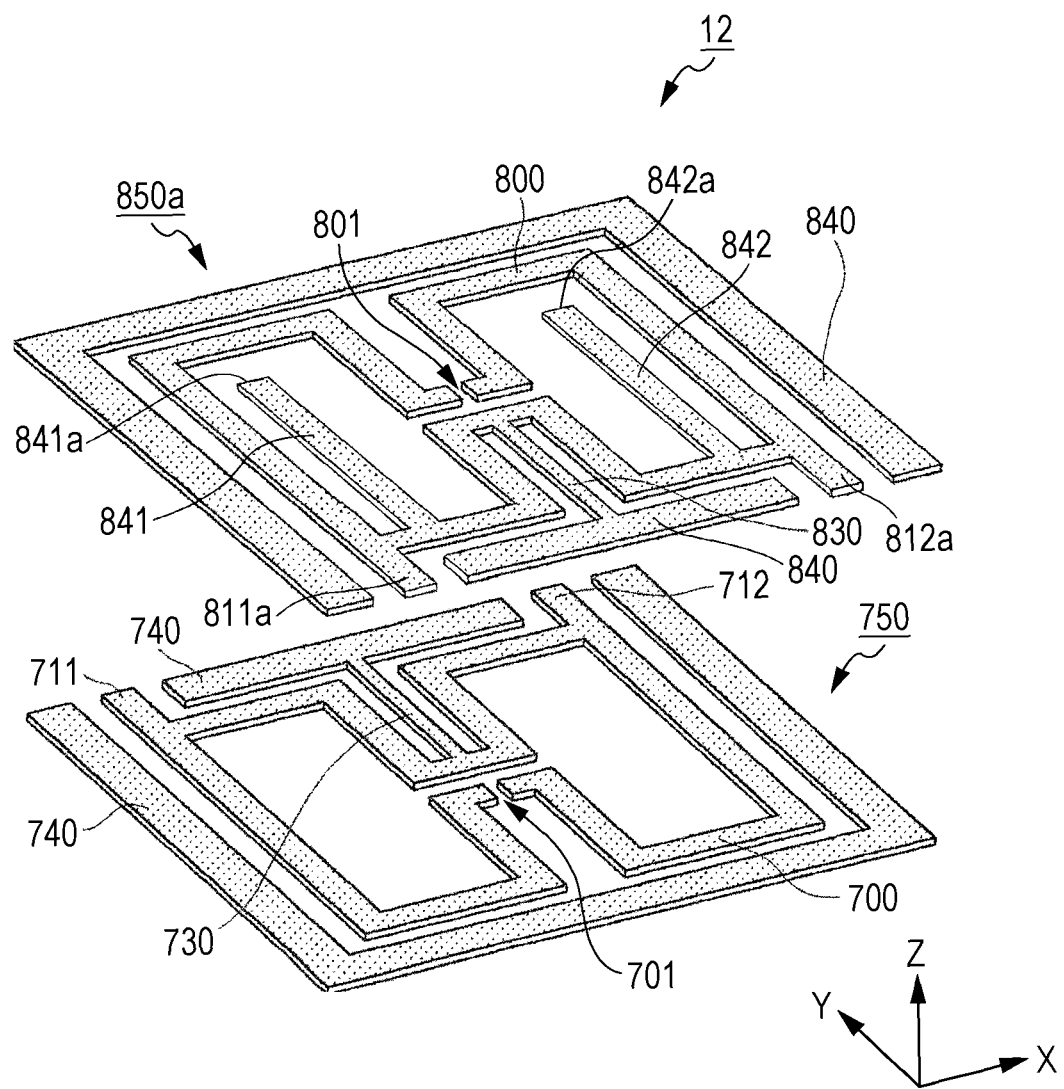
FIG. 26 is an external perspective view showing the structure of wiring included in an electromagnetic resonance coupler according to a first modification of the second embodiment.

FIG. 26 shows the structure of wiring included in an electromagnetic resonance coupler 12. The electromagnetic resonance coupler 12 includes the sending-side resonator 750 and a receiving-side resonator 850a. The sending-side resonator 750 is the same as the sending-side resonator 750 shown in FIG. 20. In the receiving-side resonator 850a, the second resonator 800, the second connection wiring 830, and the second ground wiring 840 are the same as those of the sending-side resonator 750 shown in FIG. 20. For this reason, the electromagnetic resonance coupler 12 can separately and isolatedly transmit two radio-frequency signals with a small mounting area.

Differences of the electromagnetic resonance coupler 12 from the electromagnetic resonance coupler 11 will be described below.

In the receiving-side resonator 850a, first output wiring 811a is connected to a bent portion of the second resonator 800. Second output wiring 812a is connected to a different bent portion of the second resonator 800.

In the receiving-side resonator 850a, stub wiring 841 and stub wiring 842 are both pieces of linear wiring. The stub wiring 841 extends in parallel to a long side of a first rectangular region which is surrounded by a half of the second resonator 800. The stub wiring 842 extends in parallel to a long side of a second rectangular region which is surrounded by the remaining half of the second resonator 800.

As shown in FIG. 26, a connection portion which is connected to the first output wiring 811a and a connection portion which is connected to the stub wiring 841 may be away from each other in the second resonator 800. A connection portion which is connected to the second output wiring 812a and a connection portion which is connected to the stub wiring 842 may be away from each other in the second resonator 800.

A wiring length from the connection portion connected to the first output wiring 811a to an open end 841a of the stub wiring 841 is one-quarter of the wavelength of a radio-frequency signal. A wiring length from the connection portion connected to the second output wiring 812a to an open end 842a of the stub wiring 842 is one-quarter of the wavelength of a radio-frequency signal.

[Second Modification]

An example in which input/output wiring has a different structure and peripheral wiring has a different structure will be described as a second modification.

Figure 27:
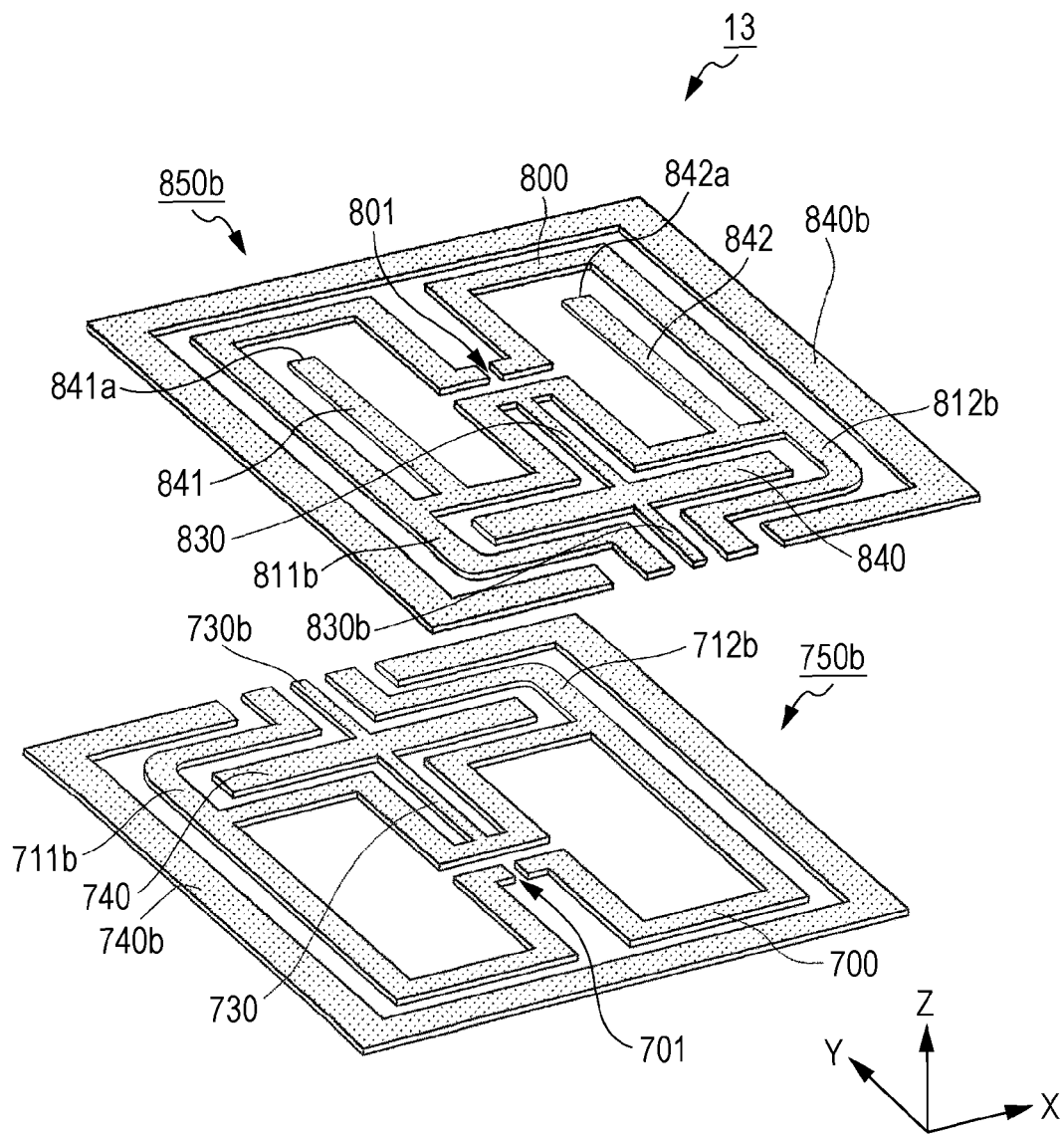
FIG. 27 is an external perspective view showing the structure of wiring included in an electromagnetic resonance coupler according to a second modification of the second embodiment.

FIG. 27 shows the structure of wiring included in an electromagnetic resonance coupler 13. The electromagnetic resonance coupler 13 includes a sending-side resonator 750b and a receiving-side resonator 850b.

The sending-side resonator 750b has the same shape as the sending-side resonator 750 in FIG. 20 except for first input wiring 711b, second input wiring 712b, leader wiring 730b, and first ground wiring 740b. The wiring length of the first input wiring 711b is equal to the wiring length of the second input wiring 712b. With this configuration, a radio-frequency signal input through the first input wiring 711b and a radio-frequency signal input through the second input wiring 712b can be synchronized. One end of the leader wiring 730b is connected to the first ground wiring 740, and the other end is located between the first input wiring 711b and the second input wiring 712b. In FIG. 27, one end of the first ground wiring 740b, one end of the first input wiring 711b, one end of the leader wiring 730b, one end of the second input wiring 712b, and the other end of the first ground wiring 740b are adjacently spaced in this order.

For example, if a sending circuit (not shown) which is connected to the sending-side resonator 750b includes a differential circuit, a semiconductor chip has so-called GSGSG pads in which three gate pads alternate with two gate pads. In this case, pieces of wiring of the sending-side resonator 750b shown in FIG. 27 may be connected so as to correspond to the layout of the pads of the semiconductor chip. With this configuration, two radio-frequency signals can be input to the sending-side resonator 750b without mutual interference.

The receiving-side resonator 850b has the same shape as the sending-side resonator 750 in FIG. 26 except for first output wiring 811b, second output wiring 812b, leader wiring 830b, and second ground wiring 840b. The first resonator 700 and the second resonator 800 face each other so as to overlap substantially in plan view. The wiring length of the first output wiring 811b is equal to the wiring length of the second output wiring 812b. With this configuration, a radio-frequency signal output from the first output wiring 811b and a radio-frequency signal output from the second output wiring 812b can be synchronized.

The wiring length of the first output wiring 811b and that of the second output wiring 812b may each be one-quarter of the wavelength of a radio-frequency signal. For example, if respective rectifiers are electrically connected to the first output wiring 811b and the second output wiring 812b, the first output wiring 811b and the second output wiring 812b may each function as the line 506 in FIG. 6. With this configuration, a harmonic of a radio-frequency signal input from each rectifier to the receiving-side resonator 850b is returned to the rectifier in an appropriate phase without separately providing wiring between the receiving-side resonator 850b and the rectifier. As a result, efficiency in conversion from radio-frequency power into DC power in the rectifier can be improved without increasing peripheral circuits.

Note that the electromagnetic resonance coupler 13 may include one pair of planar grounds which face each other across the sending-side resonator 750b and the receiving-side resonator 850b. In this case, the first connection wiring 730 may be connected to one planar ground through a conductive via, and the second connection wiring 830 may be connected to the other planar ground through a conductive via. This configuration shortens an inductance between a resonator and a ground and brings each piece of connection wiring closer to an ideal short terminal. As a result, a transmission loss can be inhibited.

Reference Examples

First Reference Example

Figure 28:
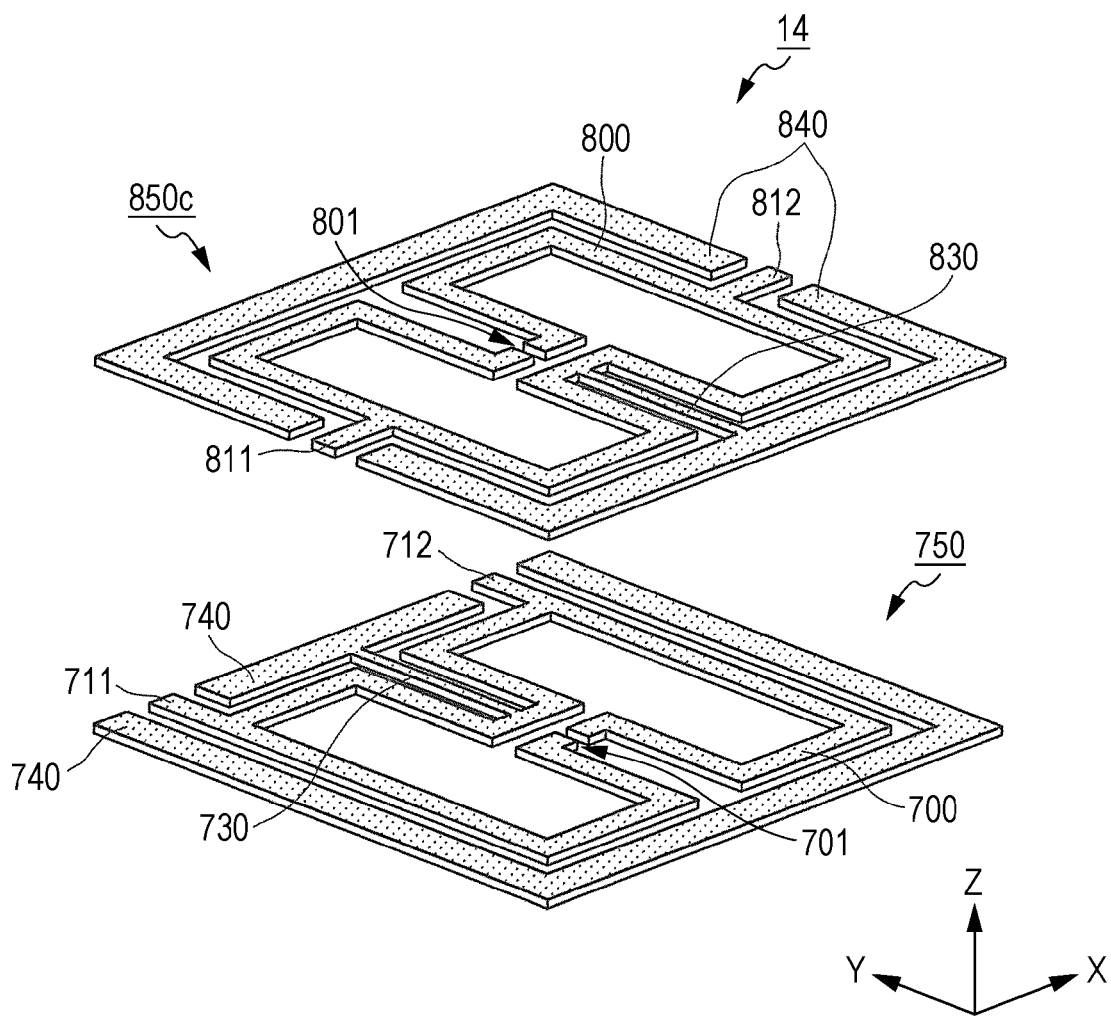
FIG. 28 is an external perspective view showing a structural example of wiring of an electromagnetic resonance coupler according to a first reference example.

FIG. 28 is an external perspective view showing the structure of wiring included in an electromagnetic resonance coupler 14 according to a first reference example. The electromagnetic resonance coupler 14 is different from the electromagnetic resonance coupler 11 shown in FIG. 20 in that a receiving-side resonator 850c does not include stub wiring.

In the electromagnetic resonance coupler 14, second resonator 800, first output wiring 811, and second output wiring 812 are the same as those of the electromagnetic resonance coupler 11 shown in FIG. 20. Thus, the electromagnetic resonance coupler 14 can improve efficiency in conversion from radio-frequency power into DC power using second-order harmonic power.

It is confirmed that a radio-frequency signal which is input into the first input wiring 711 and a radio-frequency signal which is output from the second output wiring 812 are sufficiently separated by the electromagnetic resonance coupler 14 shown in FIG. 28. This indicates that same effect can be obtained when using the electromagnetic resonance coupler 11 shown in FIG. 20.

Figure 29:
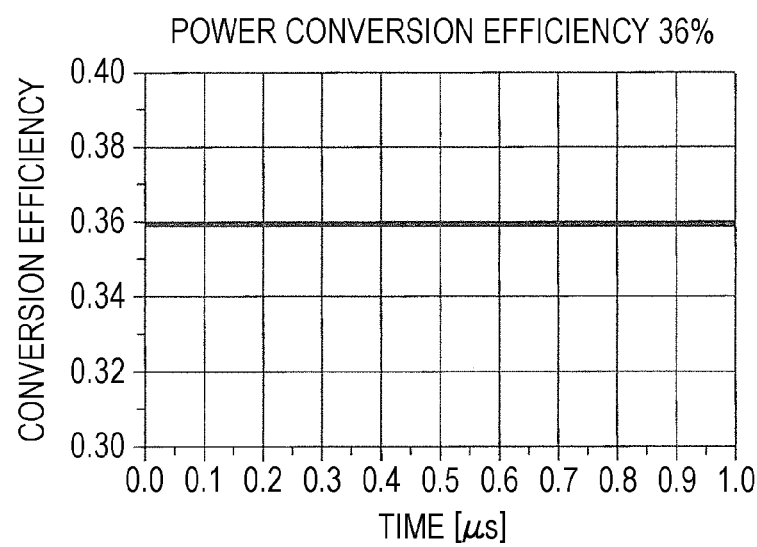
FIG. 29 is a chart showing an example of efficiency in conversion from radio-frequency power into DC power in a transmission device including the electromagnetic resonance coupler according to the first reference example and a rectifier.

FIG. 29 shows efficiency in conversion from radio-frequency power into DC power in a transmission device in which the electromagnetic resonance coupler 14 and a rectifier 500 are connected. A resistor having a resistance of 1 kΩ was connected as a load to an output terminal of the rectifier 500. An output voltage when 100 milliwatts of power was input to input wiring of each electromagnetic resonance coupler was measured. As shown in FIG. 29, in the case of the transmission device including the electromagnetic resonance coupler 14, the conversion efficiency in the rectifier 500 was 36%. The value is larger than 28% that is the conversion efficiency in the case of the transmission device including the referential electromagnetic resonance coupler (see FIG. 11). That is, the electromagnetic resonance coupler 14 can improve the conversion efficiency of the rectifier 500.

Second Reference Example

Figure 30:
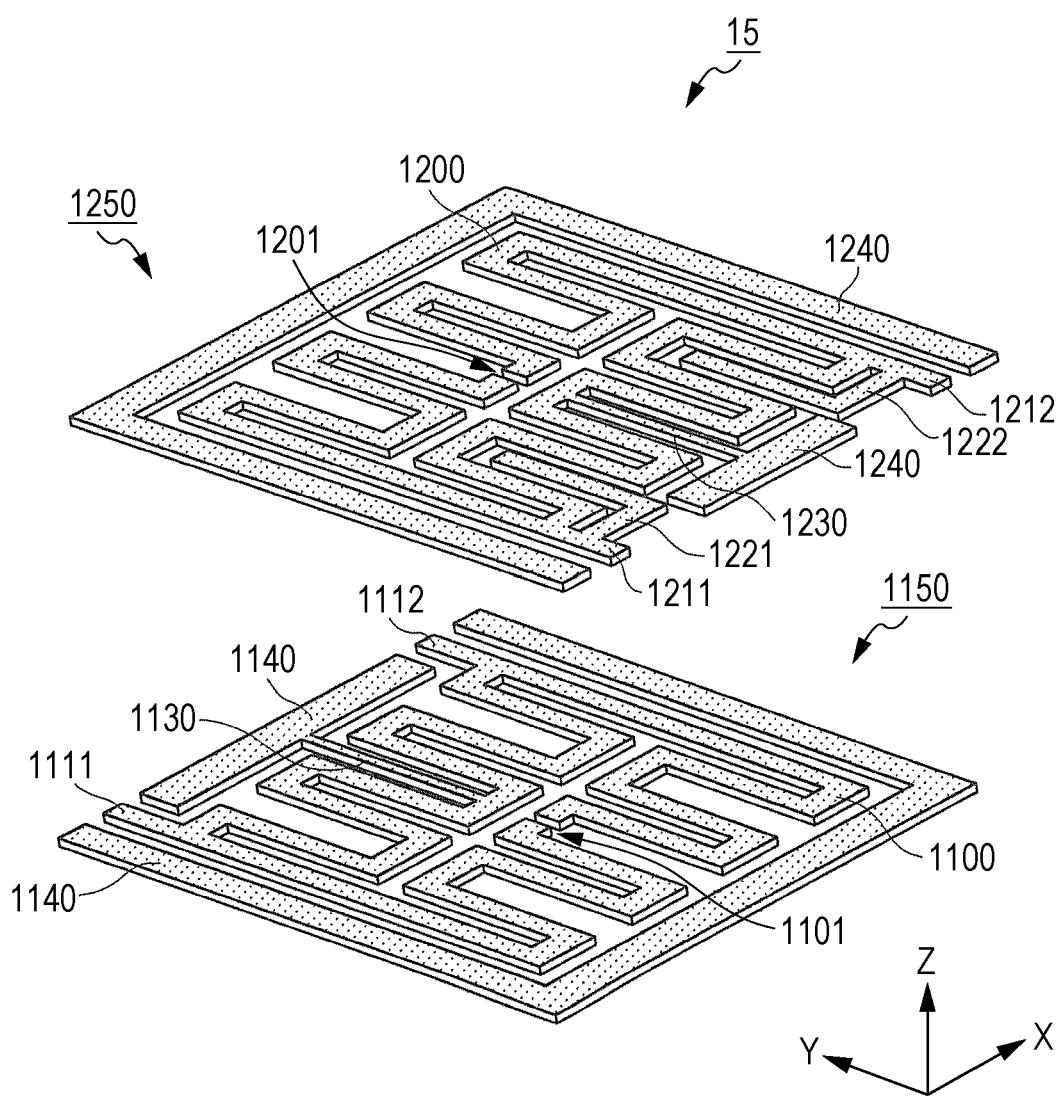
FIG. 30 is an external perspective view showing a structural example of wiring of an electromagnetic resonance coupler according to a second reference example.
Figure 31:
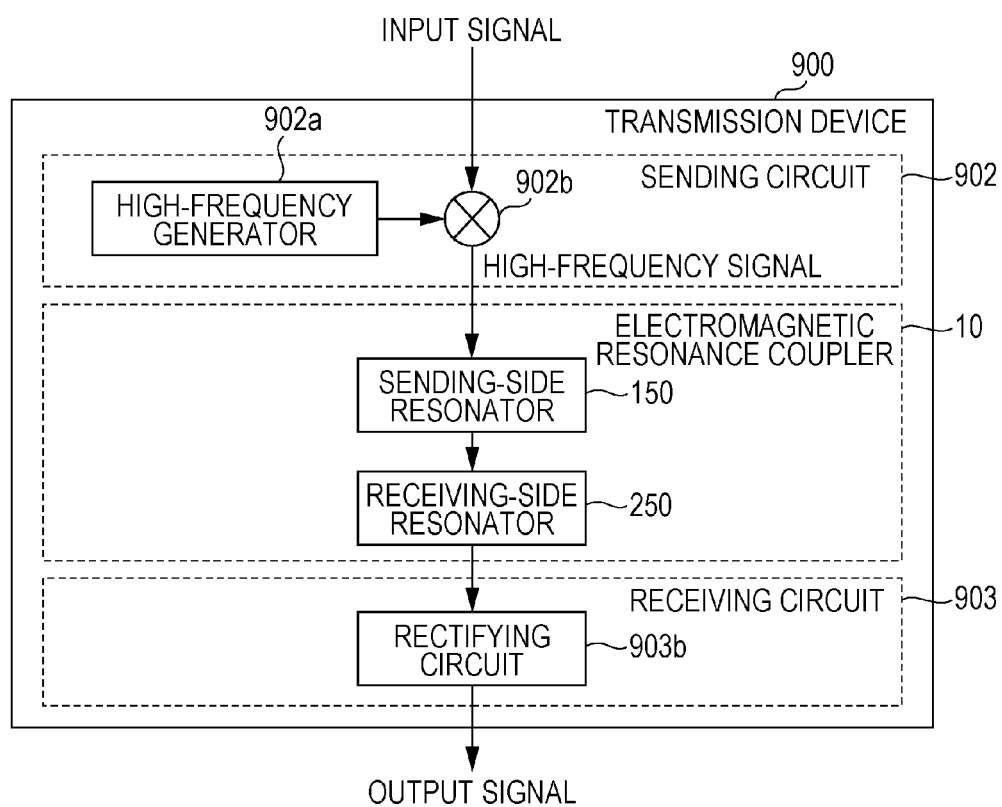
FIG. 31 is a block diagram showing a configurational example of a transmission device according to a third embodiment.

FIG. 30 is an external perspective view showing the structure of wiring included in an electromagnetic resonance coupler 15 according to a second reference example.

The electromagnetic resonance coupler 15 includes a sending-side resonator 1150 and a receiving-side resonator 1250. The sending-side resonator 1150 includes a first resonator 1100, first input wiring 1111, second input wiring 1112, first connection wiring 1130, and first ground wiring 1140. The receiving-side resonator 1250 includes a second resonator 1200, first output wiring 1211, second output wiring 1212, second connection wiring 1230, second ground wiring 1240, stub wiring 1221, and stub wiring 1222.

The first resonator 1100 and the second resonator 1200 are each a piece of looped wiring which has a plurality of inwardly concave portions in plan view. The first resonator 1100 has an open portion 1101, and the second resonator 1200 has an open portion 1201.

The stub wiring 1221 and the stub wiring 1222 are arranged outside a region surrounded by the second resonator 1200. With this configuration, even if the region surrounded by the second resonator 1200 is narrow, stub wiring may be provided.

Third Embodiment

A third embodiment will describe a transmission device including an electromagnetic resonance coupler as described above. FIG. 30 is a block diagram showing the configuration of the transmission device according to the third embodiment.

A transmission device 900 includes an electromagnetic resonance coupler 10, a sending circuit 902, and a receiving circuit 903. The transmission device 900 may include any other one of the above-described electromagnetic resonance couplers instead of the electromagnetic resonance coupler 10.

The sending circuit 902 includes a radio-frequency generator 902a and a modulation circuit 902b. The radio-frequency generator 902a generates a radio-frequency wave. The modulation circuit 902b generates a modulated signal by modulating the radio-frequency wave in accordance with an input signal. The modulated signal is an example of a radio-frequency signal. The modulation circuit 902b may be, for example, a mixing circuit or a switching circuit. The sending circuit 902 may include an amplifier.

The sending circuit 902 outputs a radio-frequency signal to input wiring 110 of a sending-side resonator 150.

The high-frequency signal is transmitted from the sending-side resonator 150 to the receiving-side resonator 250 and then is output from output wiring 210 of the receiving-side resonator 250.

The receiving circuit 903 includes a rectifying circuit 903b. The rectifying circuit 903b receives the radio-frequency signal output from the output wiring of the receiving-side resonator 250. The rectifying circuit 903b generates an output signal by rectifying the radio-frequency signal.

The rectifying circuit 903b is, for example, a rectifier 500. That is, the electromagnetic resonance coupler 10 and the rectifying circuit 903b shown in FIG. 30 may have the structure shown in FIG. 5.

The sending circuit 902 and the receiving circuit 903 may each be, for example, a semiconductor integrated circuit. The semiconductor integrated circuit may be made of a material, such as silicon, gallium arsenide, or gallium nitride.

The transmission device 900 can rectify not only a fundamental but also a harmonic in the rectifying circuit 903b with stub wiring 220 included in the electromagnetic resonance coupler 10. This allows improvement in efficiency in conversion from radio-frequency power into DC power in the rectifying circuit 903b.

Other Embodiment

The present disclosure is not limited to the specific examples described in the above-described embodiments. A technique to be disclosed in the present disclosure is not limited to the examples described in the various embodiments and can also be applied to embodiments in which appropriate changes, substitutions, additions, omissions, and the like are made. The present disclosure also includes an embodiment into which a plurality of embodiments are combined.

The frequency of a radio-frequency signal is not limited to the specific examples described above. The order of a harmonic is not limited to the specific examples described above. The width of each piece of wiring and the distance between pieces of wiring are not limited to the specific examples described above. The thickness of a substrate is not limited to the specific examples described above. The expression "electrically connected" in the present disclosure is not limited to a case where two terminals are directly connected and also refers to a case where two terminals in question are connected via an element as long as the same function can be implemented.

An electromagnetic resonance coupler according to the present disclosure may be applied to, for example, an insulating gate driver circuit.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A resonance coupler comprising:
    first resonance wiring which includes
        first open loop wiring having a first open portion,
        first input/output wiring extending outwardly from a first connection portion of the first open loop wiring, and
        first stub wiring extending inwardly from a second connection portion of the first open loop wiring, the first stub wiring including a first connection end which is connected to the second connection portion of the first open loop wiring and a first open end on a side opposite to the first connection end; and
    second resonance wiring which includes
        second open loop wiring having a second open portion, the second open loop wiring facing the first open loop wiring, and
        second input/output wiring extending outwardly from a third connection portion of the second open loop wiring, wherein
    a radio-frequency signal is isolatedly transmitted between the first open loop wiring and the second open loop wiring, and
    a wiring length from the first connection portion of the first open loop wiring to the first open end of the first stub wiring is one-quarter of a wavelength of an nth-order harmonic of the radio-frequency signal, where n is an integer not less than 2.

2. The resonance coupler according to claim 1, wherein the radio-frequency signal is
    input to the second input/output wiring,
    isolatedly transmitted from the second open loop wiring to the first open loop wiring with electromagnetic resonant coupling, and
    output from the first input/output wiring.

3. The resonance coupler according to claim 1, wherein the second resonance wiring does not include different wiring having an open end in a region surrounded by the second open loop wiring.

4. The resonance coupler according to claim 1, wherein the second resonance wiring further includes second stub wiring extending inwardly from a fourth connection portion of the second open loop wiring, the second stub wiring including a second connection end which is connected to the fourth connection portion of the second open loop wiring and a second open end on a side opposite to the second connection end, and
    a wiring length from the third connection portion of the second open loop wiring to the second open end of the second stub wiring is one-quarter of the wavelength of the nth-order harmonic.

5. The resonance coupler according to claim 1, wherein the first input/output wiring includes a connection end which is connected to the first connection portion, and the connection end of the first input/output wiring and the first connection end of the first stub wiring are located adjacent to each other across the first open loop wiring.

6. The resonance coupler according to claim 1, wherein a wiring length between the first connection portion and the second connection portion is not less than one-half of a minimum value of a wiring width of the first resonance wiring.

7. The resonance coupler according to claim 1, wherein the first stub wiring includes a main part extending along part of the first open loop wiring, and the part of the first open loop wiring and the main part of the first stub wiring are spaced by not less than one-half of a minimum value of a wiring width of the first resonance wiring.

8. The resonance coupler according to claim 1, wherein the first open loop wiring and the second open loop wiring are rectangular.

9. A resonance coupler comprising:
first resonance wiring which includes
    first open loop wiring having a first open portion,
    first output wiring extending outwardly from a first connection portion of the first open loop wiring,
    second output wiring extending outwardly from a second connection portion of the first open loop wiring,
    first stub wiring extending inwardly from a third connection portion of the first open loop wiring, the first stub wiring including a first connection end which is connected to the third connection portion of the first open loop wiring and a first open end on a side opposite to the first connection end, and
    second stub wiring extending inwardly from a fourth connection portion of the first open loop wiring, the second stub wiring including a second connection end which is connected to the fourth connection portion of the first open loop wiring and a second open end on a side opposite to the second connection end; and
second resonance wiring which includes
    second open loop wiring having a second open portion, the second open loop wiring facing the first open loop wiring for isolatedly transmitting a radio-frequency signal to the first open loop wiring, and
    first input wiring extending outwardly from a fifth connection portion of the second open loop wiring, wherein
a first wiring length from the first connection portion of the first open loop wiring to the first open end of the first stub wiring and a second wiring length from the second connection portion of the first open loop wiring to the second open end of the second stub wiring are both one-quarter of a wavelength of an nth-order harmonic of the radio-frequency signal, where n is an integer not less than 2.

10. The resonance coupler according to claim 9, wherein the first output wiring and the second output wiring are arranged symmetrically with respect to a straight line passing through the first open portion of the first open loop wiring, and the first stub wiring and the second stub wiring are arranged symmetrically with respect to the straight line.

11. The resonance coupler according to claim 9, wherein the first open loop wiring includes a first portion surrounding a first rectangular region and a second portion surrounding a second rectangular region, the first stub wiring extends in a direction along a long side of the first rectangular region in the first rectangular region, and the second stub wiring extends in a direction along a long side of the second rectangular region in the second rectangular region.

12. The resonance coupler according to claim 10, wherein the first resonance wiring further includes grounding wiring at an intersection of the first open loop wiring and the straight line, the grounding wiring being connected to the first open loop wiring.

13. The resonance coupler according to claim 9, wherein the second resonance wiring does not include different wiring having an open end in a region surrounded by the second open loop wiring.

14. The resonance coupler according to claim 9, wherein the second resonance wiring further includes second input wiring outwardly extending from a sixth connection portion of the second open loop wiring.

15. A transmission device comprising:
a first circuit from which a radio-frequency signal is output;
a second circuit into which the radio-frequency signal is input; and
a resonance coupler which isolatedly transmits the radio-frequency signal from the first circuit to the second circuit, the resonance coupler including first resonance wiring and second resonance wiring, wherein
the first resonance wiring includes
    first open loop wiring having a first open portion,
    output wiring extending outwardly from a first connection portion of the first open loop wiring, and
    first stub wiring extending inwardly from a second connection portion of the first open loop wiring, the first stub wiring including a first connection end which is connected to the second connection portion of the first open loop wiring and a first open end on a side opposite to the first connection end,
the second resonance wiring includes
    second open loop wiring facing the first open loop wiring and having a second open portion, and
    input wiring extending outwardly from a third connection portion of the second open loop wiring, and
a wiring length from the first connection portion of the first open loop wiring to the first open end of the first stub wiring is one-quarter of a wavelength of an nth-order harmonic of the radio-frequency signal, where n is an integer not less than 2.

16. The transmission device according to claim 15, wherein
the second circuit includes a diode, one electrode of which is electrically connected to the output wiring of the resonance coupler, and
a wiring length from the first connection portion of the resonance coupler to the one electrode of the diode is an odd multiple of one-quarter of the wavelength of the nth-order harmonic.

17. The transmission device according to claim 15, wherein
the first circuit generates the radio-frequency signal by modulating a radio-frequency wave in accordance with an input signal, and
the second circuit generates an output signal by rectifying the radio-frequency signal.

* * * * *